United States Patent
Zhang et al.

(10) Patent No.: US 11,783,975 B2
(45) Date of Patent: Oct. 10, 2023

(54) NANOCRYSTALLINE COBALT DOPED NICKEL FERRITE PARTICLES, METHOD OF MANUFACTURE, AND USES THEREOF

(71) Applicant: ROGERS CORPORATION, Chandler, AZ (US)

(72) Inventors: Li Zhang, Luzhou (CN); Yajie Chen, Brighton, MA (US)

(73) Assignee: ROGERS CORPORATION, Chandler, AZ (US)

(*) Notice: Subject to any disclaimer, the term of this patent is extended or adjusted under 35 U.S.C. 154(b) by 210 days.

(21) Appl. No.: 17/069,371

(22) Filed: Oct. 13, 2020

(65) Prior Publication Data

US 2021/0225566 A1    Jul. 22, 2021

Related U.S. Application Data

(60) Provisional application No. 62/916,425, filed on Oct. 17, 2019.

(51) Int. Cl.
*H01F 1/34* (2006.01)
*C01G 53/00* (2006.01)
(Continued)

(52) U.S. Cl.
CPC ........... *H01F 1/344* (2013.01); *C01G 49/009* (2013.01); *C08K 3/22* (2013.01); *C08K 7/18* (2013.01); *H01F 41/0246* (2013.01); *C01P 2002/32* (2013.01); *C01P 2002/52* (2013.01); *C01P 2002/60* (2013.01); *C01P 2002/72* (2013.01); *C01P 2004/24* (2013.01); *C01P 2004/32* (2013.01); *C01P 2004/61* (2013.01);
(Continued)

(58) Field of Classification Search
None
See application file for complete search history.

(56) References Cited

U.S. PATENT DOCUMENTS 3,020,426 A    2/1962   Van Der Burgt
3,036,007 A    5/1962   Buykx et al.
(Continued)

FOREIGN PATENT DOCUMENTS

CN    101723654 A    6/2010
CN    102486655 A    6/2012
(Continued)

OTHER PUBLICATIONS

Brockman et al., Nickel-Zinc Ferrites: I, Effect of Compostion on the Magnetic Properties of a Nickel-Zinc-(Cobalt) Ferrite, Sep. 1970, Journal of the American Ceramic Society, vol. 53, No. 9, pp. 518-520.
(Continued)

*Primary Examiner* — Ronak C Patel
(74) *Attorney, Agent, or Firm* — CANTOR COLBURN LLP

(57) ABSTRACT

Described herein is a nanocrystalline ferrite having the formula $Ni_{1-x-y}M_yCo_xFe_{2+z}O_4$, wherein M is at least one of Zn, Mg, Cu, or Mn, x is 0.01 to 0.8, y is 0.01 to 0.8, and z is −0.5 to 0.5, and wherein the nanocrystalline ferrite has an average grain size of 5 to 100 nm. A method of forming the nanocrystalline ferrite can comprise high energy ball milling.

20 Claims, 8 Drawing Sheets

(51) Int. Cl.
  *C08K 3/22* (2006.01)
  *C08K 7/18* (2006.01)
  *C01G 49/00* (2006.01)
  *H01F 41/02* (2006.01)
(52) U.S. Cl.
  CPC ...... *C01P 2004/62* (2013.01); *C01P 2006/42* (2013.01); *C08K 2003/2296* (2013.01); *C08K 2201/004* (2013.01); *C08K 2201/005* (2013.01); *C08K 2201/01* (2013.01); *C08K 2201/011* (2013.01)

(56) References Cited

U.S. PATENT DOCUMENTS

| | | | |
|---|---|---|---|
| 4,569,775 | A | 2/1986 | Kubo et al. |
| 5,110,651 | A | 5/1992 | Massard et al. |
| 5,494,749 | A | 2/1996 | Kubo et al. |
| 5,591,276 | A | 1/1997 | Yoshizawa et al. |
| 5,593,612 | A | 1/1997 | Lubitz |
| 5,616,414 | A | 4/1997 | Hopstock et al. |
| 6,071,430 | A | 6/2000 | Lebourgeois et al. |
| 6,358,432 | B1 | 3/2002 | Tomono et al. |
| 6,436,307 | B1 | 8/2002 | Lebourgeois et al. |
| 6,736,990 | B2 | 5/2004 | Aoki et al. |
| 7,348,374 | B2 | 3/2008 | Martinazzo |
| 7,482,977 | B2 | 1/2009 | Kuroda et al. |
| 8,305,281 | B2 | 11/2012 | Suetsuna et al. |
| 8,758,721 | B2 | 6/2014 | Hill |
| 9,596,755 | B2 | 3/2017 | Sethumadhavan et al. |
| 10,071,421 | B2 | 9/2018 | Suetsuna et al. |
| 10,090,088 | B2 | 10/2018 | Suetsuna et al. |
| 10,468,169 | B2 | 11/2019 | Chen et al. |
| 2003/0091841 | A1 | 5/2003 | Marusawa |
| 2003/0129405 | A1 | 7/2003 | Zhang et al. |
| 2004/0054029 | A1 | 3/2004 | Fujiki et al. |
| 2004/0069969 | A1 | 4/2004 | Endo et al. |
| 2007/0231614 | A1 | 10/2007 | Kondo et al. |
| 2009/0057606 | A1* | 3/2009 | Tada ............... H01Q 7/08 501/126 |
| 2009/0101873 | A1 | 4/2009 | Tan et al. |
| 2009/0266604 | A1 | 10/2009 | Tetsuji |
| 2009/0297432 | A1 | 12/2009 | Hill |
| 2010/0060539 | A1 | 3/2010 | Suetsuna et al. |
| 2010/0068512 | A1 | 3/2010 | Imaoka et al. |
| 2011/0147643 | A1 | 6/2011 | Ryou et al. |
| 2012/0049100 | A1 | 3/2012 | Yonetsu et al. |
| 2012/0068103 | A1 | 3/2012 | Hill et al. |
| 2012/0085963 | A1 | 4/2012 | An et al. |
| 2012/0229354 | A1 | 9/2012 | Ishikura et al. |
| 2013/0115160 | A1 | 5/2013 | Hill |
| 2013/0342414 | A1 | 12/2013 | Hong et al. |
| 2014/0264145 | A1* | 9/2014 | Ray ............... H01F 1/0063 252/62.56 |
| 2014/0291571 | A1 | 10/2014 | Hirose |
| 2014/0346387 | A1* | 11/2014 | Hill ............... C04B 35/6261 252/62.62 |
| 2015/0310971 | A1 | 10/2015 | Kmetz et al. |
| 2016/0086700 | A1 | 3/2016 | Suetsuna et al. |
| 2016/0086728 | A1 | 3/2016 | Suetsuna et al. |
| 2016/0099498 | A1 | 4/2016 | Pance et al. |
| 2016/0113113 | A1 | 4/2016 | Sethumadhavan et al. |
| 2016/0118171 | A1 | 4/2016 | Hill |
| 2016/0276072 | A1 | 9/2016 | Sethumadhavan et al. |
| 2017/0098885 | A1 | 4/2017 | Hill et al. |
| 2017/0213628 | A1 | 7/2017 | Chen et al. |
| 2018/0016157 | A1 | 1/2018 | Chen et al. |
| 2019/0013128 | A1 | 1/2019 | Chen et al. |
| 2019/0040226 | A1* | 2/2019 | Aga ............... C01G 49/0036 |
| 2019/0081377 | A1 | 3/2019 | Hill et al. |
| 2019/0264005 | A1 | 8/2019 | Horn et al. |
| 2019/0300379 | A1* | 10/2019 | Kojima ............... C08K 7/18 |
| 2019/0318858 | A1 | 10/2019 | Chen et al. |
| 2021/0032121 | A1 | 2/2021 | Li et al. |
| 2021/0043346 | A1 | 2/2021 | Li et al. |
| 2021/0065943 | A1 | 3/2021 | Zhang et al. |
| 2021/0179442 | A1 | 6/2021 | Chen et al. |
| 2021/0261433 | A1 | 8/2021 | Chen et al. |

FOREIGN PATENT DOCUMENTS

| | | | |
|---|---|---|---|
| CN | 103304186 | A | 9/2013 |
| CN | 104193224 | A | 12/2014 |
| CN | 104213250 | A | 12/2014 |
| DE | 3907220 | | 9/1990 |
| EP | 0884740 | A1 | 12/1998 |
| EP | 0905718 | A1 | 3/1999 |
| EP | 1541641 | A1 | 6/2005 |
| EP | 1652829 | | 5/2006 |
| EP | 2214180 | A1 | 8/2010 |
| EP | 2784044 | A1 | 10/2014 |
| GB | 1105788 | A | 3/1968 |
| JP | 62216922 | A | 9/1987 |
| JP | H01200605 | A | 8/1989 |
| JP | H09167703 | | 6/1997 |
| JP | H09213513 | A | 8/1997 |
| JP | H09232123 | A | 9/1997 |
| JP | 2000277973 | A | 10/2000 |
| JP | 2001085210 | A | 3/2001 |
| JP | 2009155545 | A | 7/2009 |
| TW | M417764 | B2 | 12/2011 |
| WO | 2012103020 | A2 | 8/2012 |
| WO | 2016123598 | A1 | 8/2016 |
| WO | 2017068444 | | 4/2017 |
| WO | 2018043943 | A1 | 3/2018 |

OTHER PUBLICATIONS

Narayanasamy et al., "Influence of Mechanical Milling and Thermal Annealing on Electrical And Magnetic Properties of Nanstructured Ni—Zn and Coblat Ferrites," Jun. 2208, Bull Mater Sci., vol. 31 No. 3, pp. 373-380.

Bid et al.; "Microstructure Characterization of Mechanosynthesized Nanocrystalling NiFe2O4 by Rietveld's Analysis"; Physica E 39; pp. 175-184; (2007).

Chicinas, I.; "Soft Magnetic Nanocrystalline Powders Produced by Mechanical Alloying Routes"; Journal of Optoelectronics and Advanced Materials; 8(2); pp. 439-448; (2006).

Ismail et al.; "Magnetic Properties of Mechanically Alloyed Cobalt-Zinc Ferrite Nanoparticles"; J. Supercond Nov Magn; 27; pp. 1293-1298; (2014).

Koch, C. C.; "Materials Synthesis by Mechanical Alloying"; Annu. Rev. MaterSci. 19; pp. 121-143; (1989).

Koch, C.C.; "Intermetallic Matrix Composites Prepared by Mechanical Alloying—a Review"; Materials Science and Engineering; A244; pp. 39-48; (1998).

Kong et al., "Ni—Zn Ferrites Composites With Almost Equal Values of Permeability and Permittivity for Low-Frequency Antenna Design," IEEE Transactions on Magnetics, Jan. 2007, pp. 6-9, vol. 43, No. 1.

Martin et al.; "Flexible Magnetic Composites"; Passive RF Component Technoloby, Materials Techniques and Applications; Chapters; 2012; pp. 156-185.

Ohnuma et al., "Soft Magnetic Properties of FeN/FeBN Multilayers," Journal on Magnetics, Nov. 1992, pp. 896-901, vol. 7 No. 11.

Ohnuma et al.,"Soft Magnetic Multilayers for Micromagnetic Devices,"Journal of Magnetism and Magnetic Materials, 1993, pp. 556-562, vol. 126.

Sepelak et al.; "Nanocrystalline Nickel Ferrite, NiFe2O4: Mechanosynthesis,Nonequilibrium Cation Distribution, Canted Spin Arrangement, and Magnetic Behavior"; J.Phys.Chem. C; 111; pp. 5026-5033; (2007).

Sepelak et al.; "Structural and Magnetic Properties of Nanosize Mechanosynthesized Nickel Ferrite"; Jounral of Magnetism and Magnetic Materials; 272-276; pp. 1616-1618; (2004).

Sharma et al.; "Ultra Low Loss Soft Magnetic Nanoparticles for Applications Up to S-band," Applied Physics Letters, vol. 103, 112402, Sep. 2013.

(56) References Cited

OTHER PUBLICATIONS

Thakur et al, "Low-loss Spinel Nanoferrite with Matching Permeability and Permittivity in the Ultrahigh Frequency Range," Journal of Applied Physics—Aug. 2010, vol. 108.
Waje et al.; "Sintering Temperature dependence of Room Temperature Magnetic and Dielectric Properties of Co0.5Zn0.5F3O4 Prepared using Mechanically Alloyed Nanoparticles"; Journal of magnetism and Magnetic Materials; 322; pp. 686-691; (2010).
Yang, Guo-Min, et al., "Miniaturized Patch Antennas with Ferrite/Dielectric/Ferrite Magnetodielectric Sandwich Substrate", Piers Online, vol. 7, No. 7, (Jan. 1, 2011), pp. 609-612.
Savage, R.O., et al. "Magnetic properties of single-crystal CuNi—18H and MgZn—18H solid solutions," American Institute of Physics (AIP) Conference Proceedings 24, 491 (1975), 3 pages.
Allia et al.; "Fe304 nanoparticles and nanocomposites and potential application in biomedicine and in communication technologies: Nanoparticle aggregation, interaction, and effective magnetic anistropy"; J. of Applied Physics 116: 113903 (2014) 10 pgs.
Boix, Rafael R., et al., "Characteristics of Aperture Coupled Microstrip Antennas on Magnetized Ferrite Substrates", IEEE Transactions on Antennas and Propagation, vol. 53, No. 6, (Jun. 1, 2005), pp. 1957-1966.
Brando et al., "Microwave Electromagnetic Characteristics of New Substituted M-Hexaferrites BaFe12-2xAxMexO19 (A=Ru, Ir; Me=Co, Zn)", Journal De Physique IV France, Mar. 1997.
Brockman et al. "Nickel-Zinc Ferrite: I, Effect of Composition on the Magnetic Proprties of a Nickel-Zinc-(Cobalt) Ferrite", Journal of the American Ceramic Society, vol. 53, No. 9, Sep. 1, 1970; pp. 517-520.
Cruz-Montoya et al., "Synthesis and characterization of polymer nanocomposites containing magnetic nanoparticles"; Journal of Applied Physics 107; 09B506 (2010); 4 pgs.
EP Supplemental Search Report; EP Application No. 15853114; dated Nov. 21, 2017; 8 pages.
Guo et al. Abstract of "Magnetic Properties of Ir4+ Doped Co2 Z Type Hexagonal Ferrites," Journal of Rare Earths, pp. 220-222, vol. 25, Supplement 2, Jun. 2007; 7 pgs.
Han et al.; "Microwave-absorption properties of Fe(Mn)/ferrite nanocapsules"; J. Phys. D: Appl. Phys. 42; (2009) 5 pages.
Hansen et al., "Antennas with Magneto-Dielectrics", Microwave and Optical Technology Letters, vol. 26, No. 2, Jul. 2000, pp. 75-78.
Huang et al; "Magnetic epoxy nanocomposites with superparamegnetic MnFe204 nanoparticles"; AIP Advance 5; 097183 (2015); 16 pgs.
International Preliminary Report on Patentability; International Application No. PCT/US2020/041498; International Filing Date Jul. 10, 2020, dated Jan. 27, 2022.
International Search Report for International Application No. PCT/US16/15888, International Filing Date Feb. 1, 2016, dated Jun. 10, 2016, 6 pages.
International Search Report for International Application No. PCT/US2015/055621; International Filing Date Oct. 15, 2015; dated Feb. 3, 2016; 6 pages.
International Search Report for International Application No. PCT/US2016/022800; International Filing Date Mar. 17, 2016; dated Jun. 22, 2016; 6 pages.
International Search Report for International Application No. PCT/US2020/055449; International Filing Date: Oct. 14, 2020; dated Jan. 28, 2021; 5 pages.
International Search Report; International Application No. PCT/US15/043075; International Filing Date Jul. 31, 2015; dated May 31, 2016; 4 pages.
Kristiantoro et al. , "Magnetic properties of cobalt ferrite synthesized by mechanical alloying", from AIP Conf 1964, 020003 (2018) Published Online May 15, 2018; 5 pages.
Lee et al. "Role of Small Permeability in Gigahertz Ferrite Antenna Performance," IEEE Magnetics Letter, 2013, vol. 4.
Li et al.; "Microstructure effects on shock-induced surface jetting"; Journal of Applied Physics 115; 073504 (2014); pp. 11.
Liu et al.; "Corrigendum: Electromagnetic-wave-absorption properties of wire-like structures self-assembled by FeCo nanocapsules"; J. Phys. D: Appl. Phys. 45; (2012); 7 pages.
Mattei et al., "Magnetic and dielectric properties in the UHF frequency band of half-dense Ni—Zn—Co ferrites ceramics with Fe-excess and Fe-deficiency", Journal of Magnetism and Magnetic Materials, Sep. 2017, 8 pages.
Mou, Fangzhi et al., "Oriented Contraction: A Facile Nonequilibrium Heat-Treatment Approach for Fabrication of Maghemite Fiber-in-Tube and Tube-in-Tube Nanostructures", Langmuir 2010, 26 (19), pp. 15580-15585.
Mu et al., "Improvement of high-frequency characteristics of Z-type hexaferrite by dysprosium doping", Journal of Applied Physics, 109, 123925, 2011, 6 pages.
Narayanasamy et al. "Influence of mechanical milling and thermal annealing on electrical and magnetic properties of nanostructured Ni—Zn and cobalt ferrites", Bulletin of Materials Science, vol. 31, No. 3 Jun. 1, 2008; pp. 373-380.
Pal et al.; "Synthesis and magnetic properties of gold coated iron oxide nanoparticles"; Journal of Applied Physics 105; 07B504 (2009); 4 pgs.
Pullar et al; "Hexagonal Ferrites: A Review of the Synthesis, Properties and Applications of Hexaferrite Ceramica"; Progress in Materials Science: 57; pp. 1191-1134; (2012).
Sahu et al.; "Influence of excess Fe accumulation over the surface of FePt nanoparticles: Structural and magnetic properties"; Journal of Applied Physics 113; 134303 (2013); 1 pg Abstract only.
Su et el., "Low Loss Factor Co2Z Ferrite Composites with Equivalent Permittivity and Permeability for Ultra-high Frequency Applications," Applied Physics Letters, Aug. 2014, vol. 105 No. 062402.
Thanh Ba Do; "High Temperature Composite Materials and Magnetodielectric Composites for Microwave Application"; Dissertation; University of Michigan; 2010; 223 pages.
Written Opinion for International Application No. PCT/US2020/055449; International Filing Date: Oct. 14, 2020: dated Jan. 28, 2021; 6 pages.
Written Opinion of the International Search Report for International Application No. PCT/US2015/055621; International Filing Date Oct. 15, 2015; dated Feb. 3, 2016; 15 pages.
Written Opinion of the International Search Report for International Application No. PCT/US2016/022800; International Filing Date Mar. 17, 2016; dated Jun. 22, 2016; 8 pages.
Written Opinion; International Application No. PCT/US15/043075; International Filing Date Jul. 31, 2015; dated May 31, 2016; 5 pages.
Wu et al.; "Studies of high-frequency magnetic permeability of rod-shaped CrO2 nanoparticles"; Phys. Stat. Sol. (a) 204; No. 3; pp. 755-762; 2007.
Xu et al., "Structural, dielectric and magnetic properties of Nd-doped Co2Z-type hexaferrites", Jounal of Alloys and Compounds, 509, 2011, pp. 4290-4294.
Yang, Guo-Min, et al., "Novel Compact and Low-Loss Phase Shifters With Magnetodielectric Disturber", IEEE Microwave and Wireless Components Letters, vol. 21, No. 5, (May 1, 2011); pp. 240-242.
Zaher et al.; "Osmotically driven drug delivery through remote-controlled magnetic nanocomposite membranes"; Biomicrofluidics 9; 054113 (2015); 17 pgs.
Zhen et al.; "Microwave absorption properties of FeNi3 submicrometre spheres and SiO2@FeNi3 core-shell structures"; J. Phys. D: Appl. Phys. 43; (2010); 7 pages.
Aoyama et al.; "Preparation and Characterization of Z-type Hexaferrites, Ba3(1-x)Sr3xCo2Fe24O41 with x=0-0.5, via a two-step calcination with an intermediate wet milling"; J.Electroceram; 17; pp. 61-64 (2006).
Bierlich et al., "Low-temperature sintering and magnetic properties of Sc- and In-substituted M-type hexagonal barium ferrites for microwave applications", Abstract, Feb. 2017 Materials Research Bulletin 86:19-23 ;11 pages.
Cao et al. "Hydrogen-Induced Lateral Growth of Nickel Coating on Ba3Co2Fe24O4 ⊘ (Co2Z-Based Hexaferrite during the Electro-

(56) References Cited

OTHER PUBLICATIONS plating of Multilayer Chip Inductors," Journal of The Electrochemical Society, 2002, vol. 149 Issue 12, pp. J89-J92.

Haijun et al., "The preparation and microwave properties of Ba3ZnzCo2-zFe24O41 ferrite by citrate sol-gel process", Materials Science and Engineering, B84, 2001, pp. 252-257.

Kim et al., "Effects of in3+ site occupancy on the magnetic properties of M-type strontium hexaferrites", AIB Advances 10, 015040 (2020); https://doi.org/10.1063/1.5130073; 5 pages.

Lee et al. "Figure of merit of X-type hexaferrite (Ba2Co2Fe28O46) for mobile antenna applications", Microwave and Optical Technology Letters, vol. 60, Issue 3, Feb. 5, 2018, https://doi.org/10.1002/mop.31053.

Lee et al., "Low Loss Co2Z (Ba3Co2Fe24O41)-Glass Composite for Gigahertz Antenna Application," Journal of Applies Physics, 2011, vol. 109, 07E530-2.

Li et al. "High-frequency magnetic properties of W-type barium-ferrite BaZn2-xCoxFe16O27 composites", Journal of Applied Physics 94, 5918 (2003): https://doi.org/10.1063/1.1618945.

Li et al; "Static and Dynamic Magnetic Properties of Co2Z Barium Ferrite Nanoparticie Composites"; Journal of Materials Science, 40, pp. 719-723 (2005).

Morch et al. "Structure and Magnetic properties of W-type hexaferrites," 2019, IUCRJ, pp. 492-499, vol. 6.

Park et al. "Design of Wide bandwidth microwave absorber with Ferrite composites of broad magenetic loss specturm," Advanced Materials Engineering, 2015.

Sahoo et al. Enhanced Magnetoelectricity in Bismuth Substituted SrFe12O19 Hexaferrite, Aug. 2019, Journal of Applied Physics, vol. 126, No. 7.

\* cited by examiner

NANOCRYSTALLINE COBALT DOPED NICKEL FERRITE PARTICLES, METHOD OF MANUFACTURE, AND USES THEREOF

CROSS-REFERENCE TO RELATED APPLICATION

This application claims the benefit of U.S. Provisional Patent Application Ser. No. 62/916,425 filed Oct. 17, 2019. The related application is incorporated herein in its entirety by reference.

BACKGROUND

Improved performance and miniaturization are needed to meet the ever-increasing demands of devices used in ultra-high frequency (UHF), L-band, and S-band applications, which are of particular interest in a variety of commercial and defense related industries. As an important component in radar and modern wireless communication systems, antenna elements with compact size are constantly being developed. It has, however, been challenging to develop ferrite materials for use in such high frequency applications as most ferrite materials exhibit relatively high magnetic loss at high frequencies. Accordingly, improved ferrite materials for use in high frequency applications are desired.

BRIEF SUMMARY

Disclosed herein are a nanocrystalline cobalt doped nickel ferrite particles, method of manufacture, and uses thereof.

Disclosed herein is a nanocrystalline ferrite having the formula: $Ni_{1-x-y}M_yCo_xFe_{2+z}O_4$, wherein M is at least one of Zn, Mg, Cu, or Mn, x is 0.01 to 0.8, y is 0.01 to 0.8, and z is −0.5 to 0.5, and wherein the nanocrystalline ferrite has an average grain size of 5 to 100 nm, preferably 10 to 40 nm.

Also disclosed is a composite comprising the nanocrystalline ferrite described above and a polymer.

A method of forming the nanocrystalline ferrite described above comprises high energy ball milling Ni, M, Co, and Fe precursor powders for a time and at a temperature sufficient to provide an as-milled powder having a nickel ferrite phase, and heating the as-milled powder for a time and at a temperature sufficient to produce the nanocrystalline ferrite having a nanocrystalline structure with an average grain size of 5 to 100 nanometers.

An alternative method of forming the nanocrystalline ferrite described above comprises mixing and heating of Ni, M, Co, and Fe precursor powders for a time and at a temperature sufficient to provide a mixed powder having a nickel ferrite phase; high energy ball milling the mixed powder for a time to provide a milled powder having a disordered atomic-scale structure; and heating the milled powder for a time and at a temperature sufficient to develop a nanocrystalline structure with an average grain size of 5 to 100 nm.

The above described and other features are exemplified by the following figures, detailed description, and claims.

BRIEF DESCRIPTION OF THE DRAWINGS

The following figures are exemplary aspects, which are provided to illustrate the present disclosure. The figures are illustrative of the examples, which are not intended to limit devices made in accordance with the disclosure to the materials, conditions, or process parameters set forth herein.

DETAILED DESCRIPTION

It was discovered that high energy ball milling provides $Ni_{1-x-y}M_yCo_xFe_{2+z}O_4$ ferrites such as $Ni_{0.5}Zn_{0.3}Co_{0.2}Fe_2O_4$ having a nanocrystalline grain size of 5 to 100 nanometers (nm). Such ferrites are referred to herein as nanocrystalline ferrites. When compounded with a polymer, the nanocrystalline ferrites according to the present disclosure provide composites having at least one of a low magnetic loss, high magnetic permeability, a low dielectric constant, or a low dielectric loss. The composites described herein are particularly useful in applications as antenna substrates, inductor cores, and EMI suppressors over a wide range of frequency (0.1 to 6 GHz).

The nanocrystalline ferrite has the formula $Ni_{1-x-y}M_y\text{-}Co_xFe_{2+z}O_4$, wherein M is at least one of Zn, Mg, Cu, or Mn, x is 0.01 to 0.8, y is 0.01 to 0.8, and z is −0.5 to 0.5. The nanocrystalline ferrite has an average grain size (e.g., crystallite size) of 5 to 100 nm, preferably 10 to 40 nm, as measured, for example, by X-ray diffraction with the Scherrer equation, although grain size may be generally measured by TEM.

The nanocrystalline ferrite can have the formula $Ni_{1-x-y}Zn_yCo_xFe_{2+z}O_4$, wherein x is 0.1 to 0.3, y is 0.2 to 0.4, and z is −0.5 to 0.1. The nanocrystalline ferrite can have formula $Ni_{0.5}Zn_{0.3}Co_{0.2}Fe_{2+z}O_4$, wherein z is −0.5 to 0. The nanocrystalline ferrite can have formula $Ni_{0.5}Zn_{0.3}Co_{0.2}Fe_2O_4$ or $Ni_{0.5}Zn_{0.3}Co_{0.2}Fe_{1.95}O_4$.

Figure 1C:
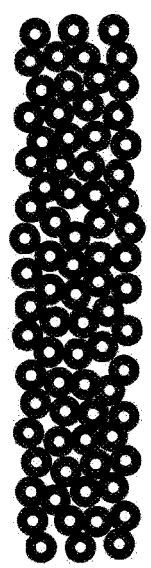
FIG. 1C is a schematic illustration of a cross-section of a platelet shaped particle with a nanocrystalline structure according to the present disclosure.
Figure 1B:
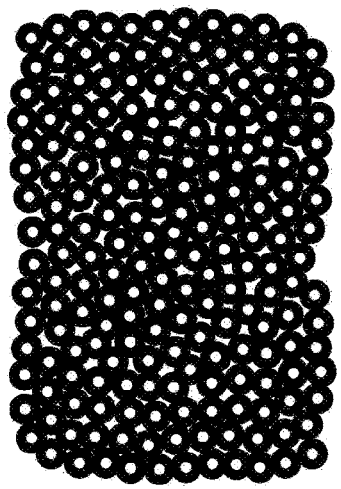
FIG. 1B is a schematic illustration of a platelet shaped particle with a nanocrystalline structure according to the present disclosure.
Figure 1A:
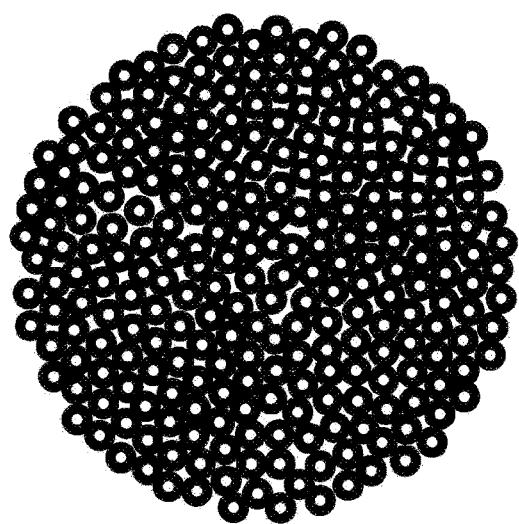
FIG. 1A is a schematic illustration of a spherical particle with a nanocrystalline structure according to the present disclosure.

The nanocrystalline ferrite can comprise spherical particles comprising the nanosized grains as illustrated in FIG. 1A. The nanocrystalline ferrite can comprise platelet particles comprising the nanosized grains as illustrated in FIG. 1B (broad surface) and FIG. 1C (cross-section). The particle size can be determined using a Horiba LA-910 laser light scattering PSD analyzer or as determined in accordance with ASTM D4464-15. Spherical particles can have average particle diameters of 0.2 to 100 micrometers. Platelet shaped particles can have at least one of a longest dimension (length) of 0.5 to 100 micrometers, or 5 to 100 micrometers or a platelet thickness of 0.05 to 1 micrometer, or 0.05 to 0.5 micrometer, with the proviso that the longest dimension is greater than the platelet thickness.

The nanocrystalline ferrite can have a permeability of 1.5 to 5 at 0.1 to 6 GHz, and/or a permittivity of 3 to 8 at 0.1 to 6 GHz, wherein permeability and permittivity are determined as a paraffin wax composite with 60 volume percent (vol. %) nanocrystalline ferrite particles based on the total volume of the composite pressed into 3×7×2.8 millimeter toroids for electromagnetic property measurement based on the total volume of the paraffin wax composite using a Vector Network Analyzer (VNA) with a coaxial line in a Nicholson-Ross-Weir (NRW) method, in a frequency range of 0.1 to 8.5 GHz. The permittivity and the permeability can be determined at a temperature of 25° C. and a relative humidity of 50±5%.

A method of forming the nanocrystalline ferrite comprises high energy ball milling stoichiometric or non-stoichiometric amounts of Ni, M, Co, and Fe precursor powders for a time and at a temperature sufficient to provide an as-milled powder. The high energy ball milling can occur for 2 to 100 hours. A vial rotation speed during the high energy ball milling can be 400 to 600 revolutions per minute (rpm). The as-milled powder can be heated for a time and at a temperature sufficient to produce the nanocrystalline ferrite having a nanocrystalline structure with an average grain size of 5 to 100 nm, preferably 10 to 40 nm. The heating can occur at a temperature of 300 to 1000 degrees Celsius (° C.). The heating can occur for 0.5 to 30 hours.

A method of forming the nanocrystalline ferrite comprises mixing stoichiometric or non-stoichiometric amounts of Ni, M, Co, and Fe precursor powders for a time and at a temperature sufficient to provide a mixed powder and heating the mixed powder for a time and at a temperature sufficient to produce a mixed ferrite having a nickel ferrite phase. The heating the mixed powder can occur at a temperature of 800 to 1,200° C. The heating the mixed powder can occur for 2 to 4 hours. The mixed ferrite can be subjected to high energy ball milling for a time to provide a milled powder having a disordered atomic-scale structure. The high energy ball milling can occur for 2 to 100 hours. A vial rotation speed during the high energy ball milling can be 400 to 600 revolutions per minute (rpm). The milled powder can be heated to form for a time and at a temperature sufficient to develop a nanocrystalline structure with an average grain size of 5 to 100 nm, preferably 10 to 40 nm. The heating can occur at a temperature of 300 to 1000 degrees Celsius (° C.). The heating can occur for 0.5 to 30 hours.

High energy ball milling is known in the art. Examples of high energy ball mills include SPEX mills, vibrating mills, cryogenic grinders, and attrition mills. Preferably, the high energy ball milling is done in the presence of balls having diameters of 3 to 20 millimeters (mm), and more preferably 3 to 10 mm. Exemplary balls include hardened chrome steel balls and exemplary vessels for milling include hardened chrome steel vessels.

In the high energy ball milling process, the ball to total powder (for example, precursor powder or calcined ferrite) mass ratio can be 20:1 to 40:1, or 30:1.

The precursors for producing the nanocrystalline ferrite include Ni, M, Co, and Fe precursor oxide or carbonate powders. Exemplary precursors include an iron oxide (for example, $\alpha\text{-}Fe_2O_3$), a nickel oxide (for example, NiO), a cobalt oxide ($Co_3O_4$), and a zinc oxide (for example, ZnO). Additional iron precursors include: $Fe(NO_3)_3 \cdot 9H_2O$, $FeCl_3 \cdot 6H_2O$, $Fe_2(SO_4)_3 \cdot H_2O$; additional nickel precursors include: $Ni(CH_3COO)_2 \cdot 4H_2O$, $Ni(NO_3)_2 \cdot 6H_2O$, $NiCl_2 \cdot 6H_2O$; additional cobalt precursors include: $Co(CH_3COO)_2 \cdot 4H_2O$, $Co(NO_3)_2 \cdot 6H_2O$, $CoCl_2 \cdot 6H_2O$; and additional zinc precursors include: $Zn(NO_3)_2 \cdot 6H_2O$, $ZnCl_2$, $ZnSO_4 \cdot 7H_2O$.

The respective heating steps can be performed, for example, in at least one of air, argon, nitrogen, or oxygen. The heating steps can release internal stress in addition to controlling grain size, and ferrite phase formation.

A composite can comprise the nanocrystalline ferrites and a polymer. The polymer can comprise a thermoplastic or a thermoset. As used herein, the term "thermoplastic" refers to a material that is plastic or deformable, melts to a liquid when heated, and freezes to a brittle, glassy state when cooled sufficiently. Examples of thermoplastic polymers that can be used include cyclic olefin polymers (including polynorbornenes and copolymers containing norbornenyl units, for example, copolymers of a cyclic polymer such as norbornene and an acyclic olefin such as ethylene or propylene), fluoropolymers (for example, poly(vinyl fluoride) (PVF), poly(vinylidene fluoride) (PVDF), fluorinated ethylene-propylene (FEP), polytetrafluoroethylene (PTFE), poly (ethylene-tetrafluoroethylene) (PETFE), or perfluoroalkoxy (PFA)), polyacetals (for example, polyoxyethylene and polyoxymethylene), poly($C_{1-6}$ alkyl)acrylates, polyacrylamides (including unsubstituted and mono-N— or di-N—($C_{1-8}$ alkyl)acrylamides), polyacrylonitriles, polyamides (for example, aliphatic polyamides, polyphthalamides, or polyaramides), polyamideimides, polyanhydrides, polyarylene ethers (for example, polyphenylene ethers), polyarylene ether ketones (for example, polyether ether ketones (PEEK) and polyether ketone ketones (PEKK)), polyarylene ketones, polyarylene sulfides (for example, polyphenylene sulfides (PPS)), polyarylene sulfones (for example, polyethersulfones (PES), polyphenylene sulfones (PPS), and the like), polybenzothiazoles, polybenzoxazoles, polybenzimidazoles, polycarbonates (including homopolycarbonates or polycarbonate copolymers such as polycarbonate-siloxanes, polycarbonate-esters, or polycarbonate-ester-siloxanes), polyesters (for example, polyethylene terephthalates, polybutylene terephthalates, polyarylates, or polyester copolymers such as polyester-ethers), polyetherimides (for example, copolymers such as polyetherimide-siloxane copolymers), polyimides (for example, copolymers such as polyimide-siloxane copolymers), poly($C_{1-6}$ alkyl)methacrylates, polyalkylacrylamides (for example, unsubstituted and mono-N— or di-N—($C_{1-8}$ alkyl)acrylamides), polyolefins (for example, polyethylenes, such as high density polyethylene (HDPE), low density polyethylene (LDPE), and linear low density polyethylene (LLDPE), polypropylenes, and their halogenated derivatives (such as polytetrafluoroethylenes), and their copolymers, for example ethylene-alpha-olefin copolymers), polyoxadiazoles, polyoxymethylenes, polyphthalides, polysilazanes, polysiloxanes (silicones), polystyrenes (for example, copolymers such as acrylonitrile-butadiene-styrene (ABS) or methyl methacrylate-butadiene-styrene (MB S)), polysulfides, polysulfonamides, polysulfonates, polysulfones, polythioesters, polytriazines, polyureas, polyurethanes, vinyl polymers (for example, polyvinyl alcohols, polyvinyl esters, polyvinyl ethers, polyvinyl halides (for example, polyvinyl chloride), polyvinyl ketones, polyvinyl nitriles, or polyvinyl thioethers), a paraffin wax, or the like. A combination comprising at least one of the foregoing thermoplastic polymers can be used.

Thermoset polymers are derived from thermosetting monomers or prepolymers (resins) that can irreversibly harden and become insoluble with polymerization or cure, which can be induced by heat or exposure to radiation (for example, ultraviolet light, visible light, infrared light, or electron beam (e-beam) radiation). Thermoset polymers include alkyds, bismaleimide polymers, bismaleimide triazine polymers, cyanate ester polymers, benzocyclobutene polymers, benzoxazine polymers, diallyl phthalate polymers, epoxies, hydroxymethylfuran polymers, melamine-formaldehyde polymers, phenolics (including phenol-formaldehyde polymers such as novolacs and resoles), benzoxazines, polydienes such as polybutadienes (including homopolymers and copolymers thereof, for example, poly(butadiene-isoprene)), polyisocyanates, polyureas, polyurethanes, triallyl cyanurate polymers, triallyl isocyanurate polymers, certain silicones, and polymerizable prepolymers (for example, prepolymers having ethylenic unsaturation, such as unsaturated polyesters, polyimides), or the like. The prepolymers can be polymerized, copolymerized, or cross-linked, for example, with a reactive monomer such as styrene, alpha-methylstyrene, vinyltoluene, chlorostyrene, acrylic acid, (meth)acrylic acid, a ($C_{1-6}$ alkyl)acrylate, a ($C_{1-6}$ alkyl) methacrylate, acrylonitrile, vinyl acetate, allyl acetate, triallyl cyanurate, triallyl isocyanurate, or acrylamide.

The polymer can comprise at least one of a fluoropolymer (for example, polyvinylidene fluoride (PVDF) or polytetrafluoroethylene (PTFE)), a polyolefin (for example, polyethylene (PE), high density polyethylene (HDPE), or low density polyethylene (LDPE)), a poly(arylene ether ketone) (for example, polyether ether ketone (PEEK)), a poly alkyl (meth)acrylate (for example, polymethylmethacrylate (PMMA)), or a poly(ether sulfone).

A method of forming the composite is not limited and can comprise at least one of compression molding, injection molding, reaction injection molding, extruding, rolling, and the like.

The composite can comprise 5 to 95 vol. %, or 30 to 70 vol. %, of the nanocrystalline ferrites based on the total volume of the composite. The composite can comprise 5 to 95 vol. %, or 30 to 70 vol. %, of the polymer based on the total volume of the composite.

The polymer composite comprising the nanocrystalline ferrites can have a magnetic loss tangent of less than or equal to 0.05 at 1 to 3 gigahertz (GHz), or 0.001 to 0.02, or 0.001 to 0.01 at 0.5 to 2.5 GHz, or 0.5 to 2 GHz. Preferably, the polymer composite comprising the nanocrystalline ferrites maintains a permeability of greater than or equal to 2, or greater than or equal to 3 at 1 to 3 GHz while maintaining a magnetic loss tangent at 1 to 3 GHz of less than or equal to 0.05, or less than or equal to 0.02. Magnetic materials with such a low magnetic loss can advantageously be used in high frequency applications such as in antenna applications.

The polymer composite comprising the nanocrystalline ferrites can have a permeability at 1 to 3 GHz of greater than or equal to 2, or greater than or equal to 3, or greater than or equal to 5. The polymer composite comprising the nanocrystalline ferrites can have a high permeability over a broad frequency range of 0.1 to 6 GHz of greater than or equal to 2, or greater than or equal to 3.

The polymer composite comprising the nanocrystalline ferrites can have a permittivity at 1 GHz, or 0.1 to 6 GHz of less than or equal to 3, 4, 5, 6, 7, or 8, wherein the permittivity is tunable depending upon the loading fraction of the nanocrystalline ferrites in the composite.

The polymer composite comprising the nanocrystalline ferrites can have a dielectric loss tangent at 1 GHz, or 0.1 to 6 GHz of less than or equal to 0.02.

The polymer composite comprising the nanocrystalline ferrites can have a resonance frequency of 1 to 6 GHz.

The polymer composite may include additional additives such as dielectric fillers and flame retardants. The additional additives can be present in an amount of less than or equal to 5 vol. % of the total volume of the composite.

A particulate dielectric filler may be employed to adjust the dielectric constant, dissipation factor, coefficient of thermal expansion, and other properties of the composite. Exemplary dielectric fillers include titanium dioxide (rutile and anatase), barium titanate, strontium titanate, silica (including fused amorphous silica), corundum, wollastonite, $Ba_2Ti_9O_{20}$, solid glass spheres, synthetic glass or ceramic hollow spheres, quartz, boron nitride, aluminum nitride, silicon carbide, beryllia, alumina, alumina trihydrate, magnesia, mica, talcs, nanoclays, magnesium hydroxide, and combinations comprising at least one of the foregoing.

Flame retardants can be halogenated or unhalogenated. An exemplary inorganic flame retardant is a metal hydrate such as a hydrate of a metal such as Mg, Ca, Al, Fe, Zn, Ba, Cu, Ni, or a combination comprising at least one of the foregoing. Specific hydrates include aluminum hydroxide, magnesium hydroxide, calcium hydroxide, iron hydroxide, zinc hydroxide, copper hydroxide and nickel hydroxide; and hydrates of calcium aluminate, gypsum dihydrate, zinc borate and barium metaborate. Organic flame retardants can be used, alternatively or in addition to the inorganic flame retardants. Examples of inorganic flame retardants include melamine cyanurate, fine particle size melamine polyphosphate, various other phosphorus-containing compounds such as aromatic phosphinates, diphosphinates, phosphonates, and phosphates, certain polysilsesquioxanes, siloxanes, and halogenated compounds such as hexachloroendomethylenetetrahydrophthalic acid (HET acid), tetrabromophthalic acid and dibromoneopentyl glycol, for example.

Also included herein are articles comprising the nanocrystalline ferrites. The article can be a microwave device, such as an antenna or an inductor. The article can be a transformer, an inductor, or an anti-electromagnetic interface material. The article can be an antenna such as a patch antenna, an inverted-F antenna, or a planar inverted-F antenna. The article can be a magnetic bus bar, for example, for wireless charging; an NFC shielding material; or an electronic bandgap meta-material. The magnetic particles can be used in microwave absorption or microwave shielding applications.

The nanocrystalline ferrite can have the formula: $Ni_{1-x-y}M_yCo_xFe_{2+z}O_4$, wherein M is at least one of Zn, Mg, Cu, or Mn, x is 0.01 to 0.8, y is 0.01 to 0.8, and z is −0.5 to 0.5. The nanocrystalline ferrite can have an average grain size of 5 to 100 nm, or 10 to 40 nm. The nanocrystalline ferrite can have the formula $Ni_{1-x-y}Zn_yCo_xFe_{2+z}O_4$, wherein x is 0.1 to 0.3, y is 0.2 to 0.4, and z is −0.5 to 0.1. The nanocrystalline ferrite can comprise spherical particles with an average particle diameter of 0.2 to 100 micrometers. The nanocrystalline ferrite can comprise platelet shaped particles with a longest dimension of 0.5 to 100 micrometers and a thickness of 0.05 to 1 micrometer, with the proviso that the longest dimension is greater than the platelet thickness. The nanocrystalline ferrite can have a permeability of 1.5 to 5 at 0.1 to 6 gigahertz determined as a paraffin wax composite with 60 volume percent nanocrystalline ferrite based on the total volume of the paraffin wax composite. The nanocrystalline ferrite can have a permittivity of 3 to 8 at 0.1 to 6 gigahertz determined as a paraffin wax composite with 60 volume percent nanocrystalline ferrite based on the total volume of the paraffin wax composite.

A composite can comprise the nanocrystalline ferrite and a polymer. The polymer can comprise, for example, at least one of a fluoropolymer (for example, polyvinylidene fluoride (PVDF) or polytetrafluoroethylene (PTFE)), a polyolefin (for example, polyethylene (PE), high density polyethylene (HDPE), or low density polyethylene (LDPE)), a poly(arylene ether ketone) (for example, polyether ether ketone (PEEK)), a poly alkyl (meth)acrylate (for example, polymethylmethacrylate (PMMA)), or a poly(ether sulfone). The composite can comprise 5 to 95 volume percent, or 30 to 70 volume percent of the nanocrystalline ferrite based on the total volume of the composite. The composite can comprise 5 to 95 volume percent, or 30 to 70 volume percent of the polymer based on the total volume of the composite. The composite can have a permeability at 1 to 3 gigahertz of greater than or equal to 2, or greater than or equal to 3, or greater than or equal to 5, or 2 to 10. The composite can have a magnetic loss tangent at 1 to 3 gigahertz of less than or equal to 0.05, or less than or equal to 0.02, or greater than 0 to 0.05. The composite can have a permittivity at 0.1 to 6 gigahertz of less than or equal to 3, 4, 5, 6, 7, or 8, or 1 to 8. The composite can have a dielectric loss tangent at 0.1 to 6 gigahertz of less than or equal to 0.02 or greater than 0 to 0.02. The composite can have a resonance frequency of 1 to 6 gigahertz. The composite can have a magnetic loss tangent at 1 to 3 gigahertz of less than or equal to 0.05, or less than or equal to 0.02. The composite can have a permeability at 1 to 3 gigahertz of greater than or equal to 3, or greater than or equal to 2. An article can comprise comprising the nanocrystalline ferrite, for example, in the form of a composite. The article can be an antenna, a transformer, an anti-electromagnetic interface material, or an inductor; and/or wherein the article is a microwave device.

A method of forming the nanocrystalline ferrite can comprise high energy ball milling Ni, M, Co, and Fe precursor powders for a time (for example, 2 to 100 hours) and at a temperature sufficient (for example, 800 to 1200° C.) to provide an as-milled powder having a nickel ferrite phase, wherein the high energy ball milling optionally occurs at a vial rotation speed of 400 to 600 rpm, and heating the as-milled powder for a time (for example, 0.5 to 30 hours) and at a temperature (for example, 300 to 1,000° C.) sufficient to produce the nanocrystalline ferrite having a nanocrystalline structure with an average grain size of 5 to 100 nanometers. A method of forming the nanocrystalline ferrite can comprise mixing and heating of Ni, M, Co, and Fe precursor powders for a time (for example, 2 to 4 hours) and at a temperature (for example, 800 to 1200° C.) sufficient to provide a mixed powder having a nickel ferrite phase; high energy ball milling the mixed powder for a time (for example, 2 to 100 hours) to provide a milled powder having a disordered atomic-scale structure, wherein the high energy ball milling can optionally have a vial rotation speed of 400 to 600 rpm; and heating the milled powder for a time (for example, 0.5 to 30 hours) and at a temperature (for example, 300 to 1000° C.) sufficient to develop a nanocrystalline structure with an average grain size of 5 to 100 nm, or 10 to 40 nm. The precursor powders can comprise $\alpha$-$Fe_2O_3$, NiO, $Co_3O_4$, and ZnO. The ball to total powder mass ratio during the high energy ball milling can be 20:1 to 40:1. The balls can have diameters of 3 mm to 20 mm. The heating can be done in at least one of air, argon, nitrogen, or oxygen.

The following examples are provided to illustrate the present disclosure. The examples are merely illustrative and are not intended to limit devices made in accordance with the disclosure to the materials, conditions, or process parameters set forth therein.

EXAMPLES

In order to determine the electromagnetic properties of the nanocrystalline ferrites, the nanocrystalline ferrites were mixed with paraffin (60 vol. % of ferrite particles) and pressed into 3×7×2.8 millimeter toroids for electromagnetic property measurement (magnetic permeability and permittivity) by Vector Network Analyzer (VNA) with a coaxial line in a Nicholson-Ross-Weir (NRW) method, in a frequency range of 0.1 to 8.5 GHz. The permittivity and the permeability can be determined at a temperature of 25° C. and a relative humidity of 50±5%.

Figure 2:
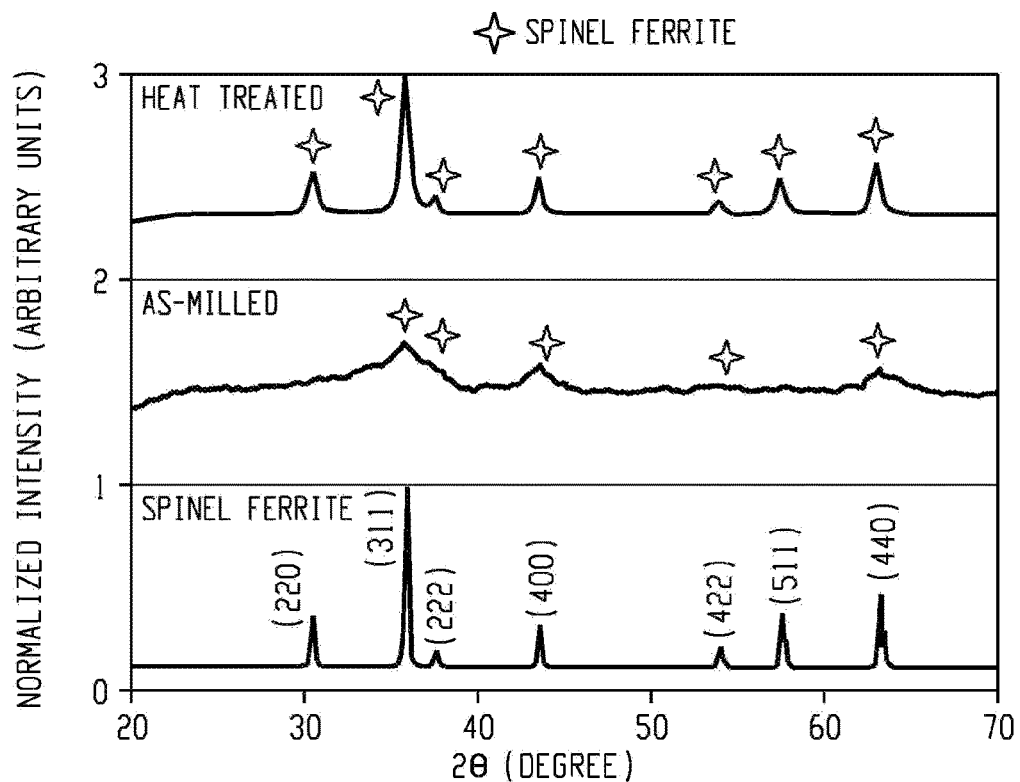
FIG. 2 shows the XRD pattern of the nanocrystalline $Ni_{0.5}Zn_{0.3}Co_{0.2}Fe_2O_4$ particles (spherical) produced in Example 1.
Figure 3:
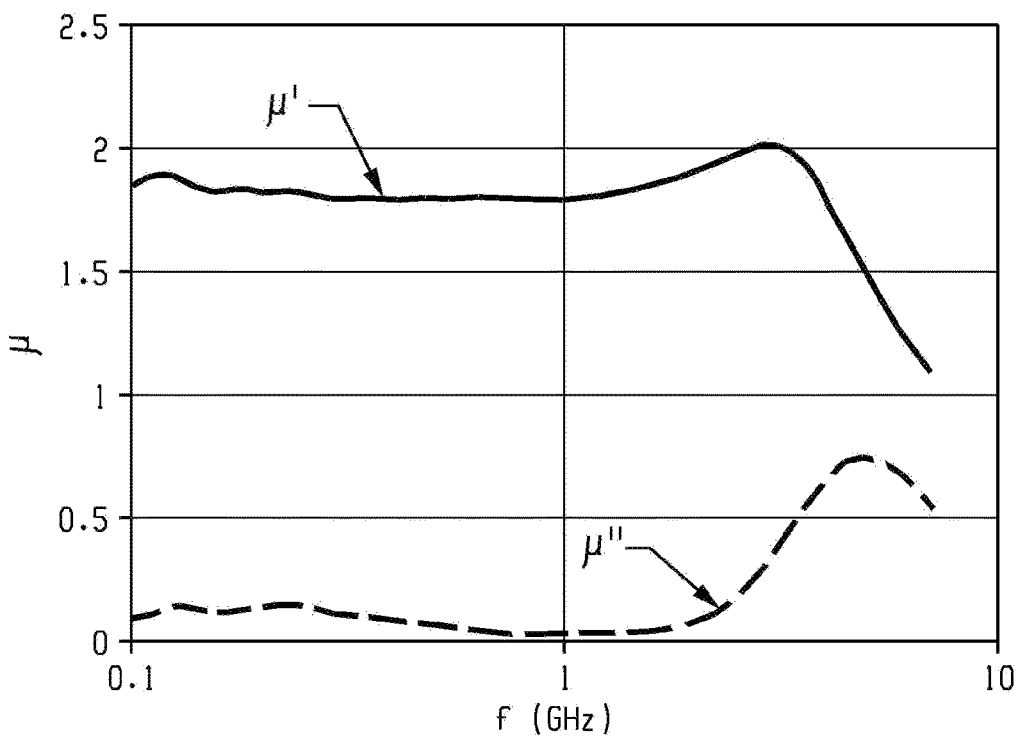
FIG. 3 shows the complex permeability of the nanocrystalline $Ni_{0.5}Zn_{0.3}Co_{0.2}Fe_2O_4$ particle-paraffin wax composite produced in Example 1.
Figure 4:
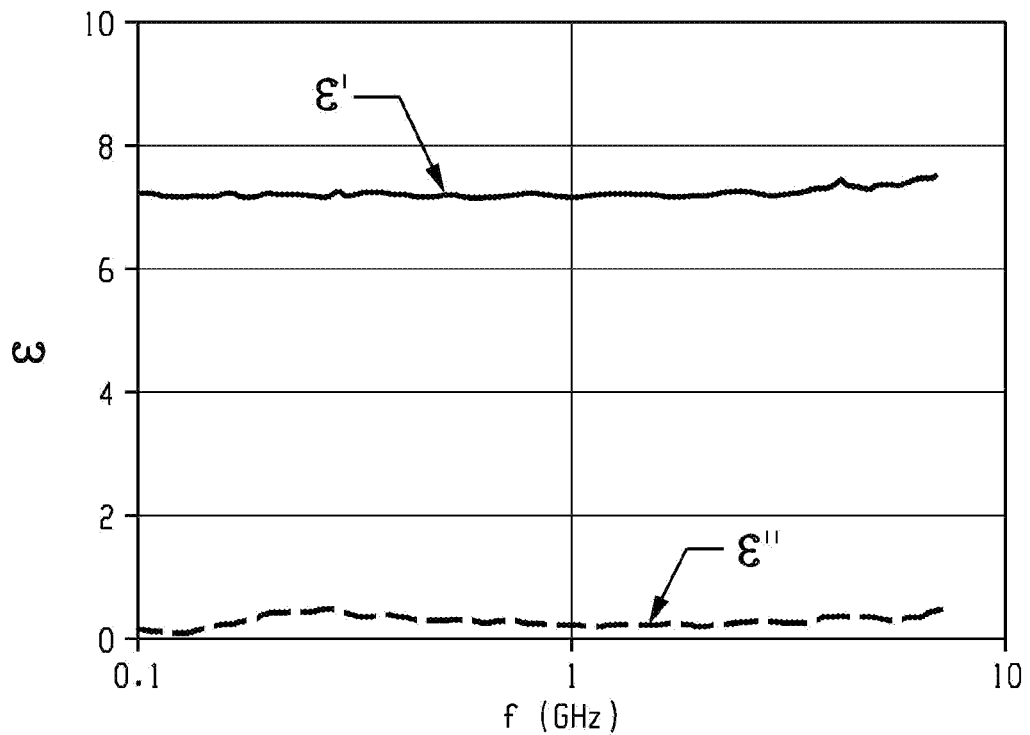
FIG. 4 shows the complex permittivity of the nanocrystalline $Ni_{0.5}Zn_{0.3}Co_{0.2}Fe_2O_4$ particle-paraffin wax composite produced in Example 1.

Example 1: Preparation of $Ni_{0.5}Zn_{0.3}Co_{0.2}Fe_2O_4$; Heat Treatment in Argon $Ni_{0.5}Zn_{0.3}Co_{0.2}Fe_2O_4$ was prepared from a stoichiometric mixture of 30 grams (g) $\alpha$-$Fe_2O_3$, NiO, ZnO, and $Co_3O_4$ powders that were loaded into a planetary ball mill. Hardened chrome steel vials (500 milliliters (mL) in volume) and 10 mm hardened chrome steel balls were used in the milling process. The ball to powder mass ratio was 30:1. Milling was performed in air at 500 rpm for 30 hours. The synthesized cobalt-doped nickel zinc ferrite power was heat treated in argon at 600° C. for 2 hours to control the nanocrystalline structure and ferrite phase. Then, the heat treated particles were blended with paraffin wax and tested using an NRW method as described above. FIG. 2 shows the XRD pattern of the nanocrystalline $Ni_{0.5}Zn_{0.3}Co_{0.2}Fe_2O_4$ particles (spherical) produced. FIG. 3 shows the complex permeability of the nanocrystalline $Ni_{0.5}Zn_{0.3}Co_{0.2}Fe_2O_4$ particle-paraffin wax composite. FIG. 4 shows the complex permittivity of the nanocrystalline $Ni_{0.5}Zn_{0.3}Co_{0.2}Fe_2O_4$ particle-paraffin wax composite. Table 1 provides a summary of the electromagnetic properties of the nanocrystalline $Ni_{0.5}Zn_{0.3}Co_{0.2}Fe_2O_4$.

TABLE 1

Summary of electromagnetic properties for the nanocrystalline
$Ni_{0.5}Zn_{0.3}Co_{0.2}Fe_2O_4$ particle-paraffin wax composite.

| f (GHz) | 0.5 | 1 | 1.6 | 2 | 3 |
|---|---|---|---|---|---|
| $\mu'$ | 1.79 | 1.79 | 1.84 | 1.90 | 2.00 |
| $Tan\delta_\mu$ | 0.038 | 0.020 | 0.022 | 0.038 | 0.171 |
| $\epsilon'$ | 7.16 | 7.17 | 7.17 | 7.19 | 7.20 |
| $Tan\delta_\epsilon$ | 0.036 | 0.026 | 0.025 | 0.025 | 0.028 |

Figure 5:
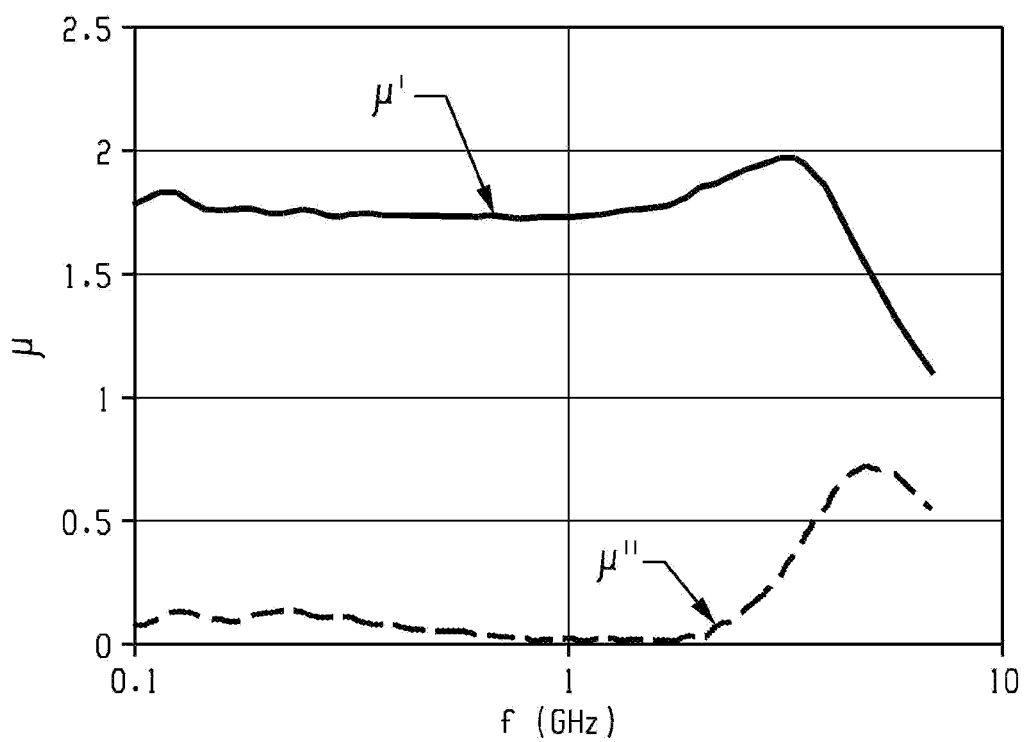
FIG. 5 shows the complex permeability of the nanocrystalline $Ni_{0.5}Zn_{0.3}Co_{0.2}Fe_2O_4$ particle-paraffin wax composite produced in Example 2.
Figure 6:
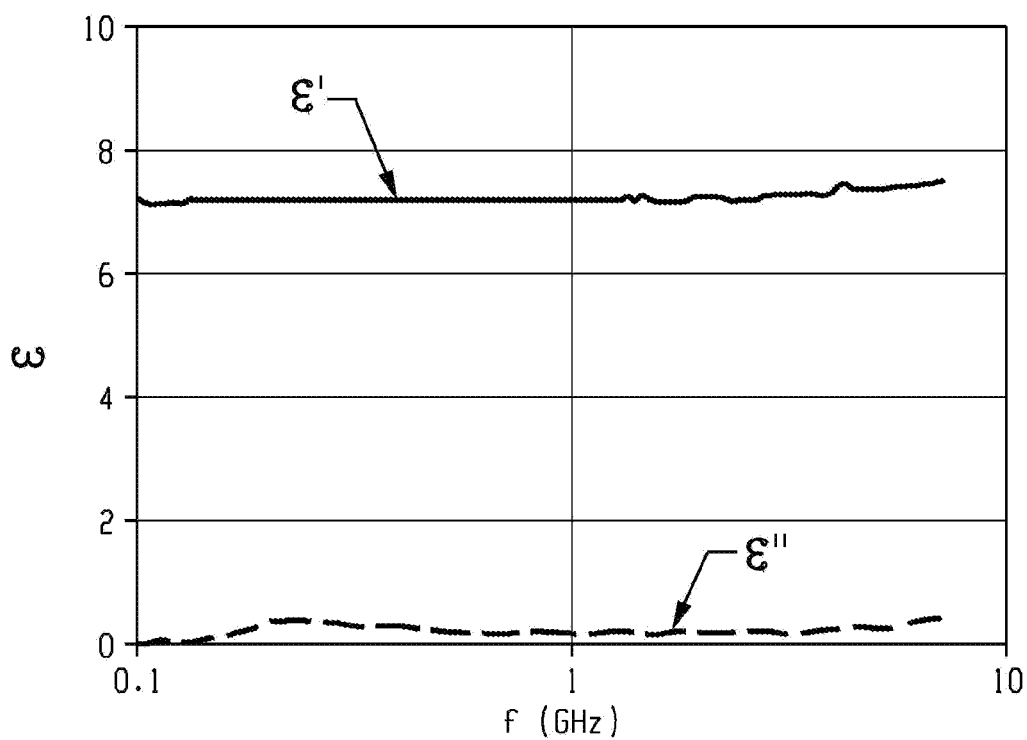
FIG. 6 shows the complex permittivity of the nanocrystalline $Ni_{0.5}Zn_{0.3}Co_{0.2}Fe_2O_4$ particle-paraffin wax composite produced in Example 2.

Example 2: Preparation of $Ni_{0.5}Zn_{0.3}Co_{0.2}Fe_2O_4$; Heat Treatment in Nitrogen $Ni_{0.5}Zn_{0.3}Co_{0.2}Fe_2O_4$ was prepared from a stoichiometric mixture of 30 g $\alpha$-$Fe_2O_3$, NiO, ZnO, and $Co_3O_4$ powders which were loaded into a planetary ball mill. Hardened chrome steel vials (500 mL in volume) and 10 mm hardened chrome steel balls were used in the milling process. The ball to powder mass ratio was 30:1. Milling was performed in air at 500 rpm for 30 hours. The synthesized cobalt-doped nickel zinc ferrite power was heat treated in an atmosphere of 1 vol. % $O_2$ and 99 vol. % $N_2$ at 600° C. for 2 hours to control the nanocrystalline structure, ferrite phase, and $Fe^{2+}$. Then, the heat treated particles were blended with paraffin wax and tested using an NRW method as described above. FIG. 5 shows the complex permeability of the nanocrystalline $Ni_{0.5}Zn_{0.3}Co_{0.2}Fe_2O_4$ particle-paraffin wax composite. FIG. 6 shows the complex permittivity of the nanocrystalline $Ni_{0.5}Zn_{0.3}Co_{0.2}Fe_2O_4$ particle-paraffin wax composite. Table 2 provides a summary of the electromagnetic properties of the nanocrystalline $Ni_{0.5}Zn_{0.3}Co_{0.2}Fe_2O_4$.

TABLE 2

Summary of electromagnetic properties for the nanocrystalline
$Ni_{0.5}Zn_{0.3}Co_{0.2}Fe_2O_4$ particle-paraffin wax composite.

| f (GHz) | 0.5 | 1 | 1.6 | 2 | 3 |
|---|---|---|---|---|---|
| $\mu'$ | 1.74 | 1.74 | 1.78 | 1.85 | 1.97 |
| $Tan\delta_\mu$ | 0.032 | 0.012 | 0.012 | 0.020 | 0.138 |
| $\epsilon'$ | 7.20 | 7.21 | 7.21 | 7.24 | 7.23 |
| $Tan\delta_\epsilon$ | 0.036 | 0.026 | 0.026 | 0.026 | 0.030 |

Figure 7:
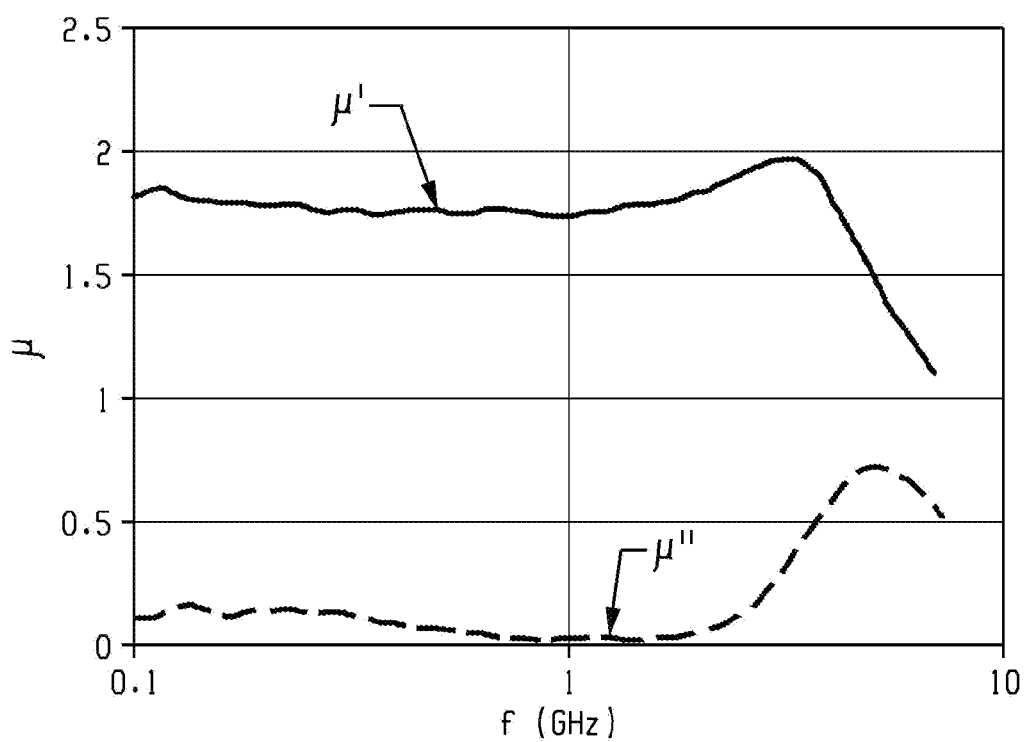
FIG. 7 shows the complex permeability of the nanocrystalline $Ni_{0.5}Zn_{0.3}Co_{0.2}Fe_2O_4$ particle-paraffin wax composite produced in Example 3.
Figure 8:
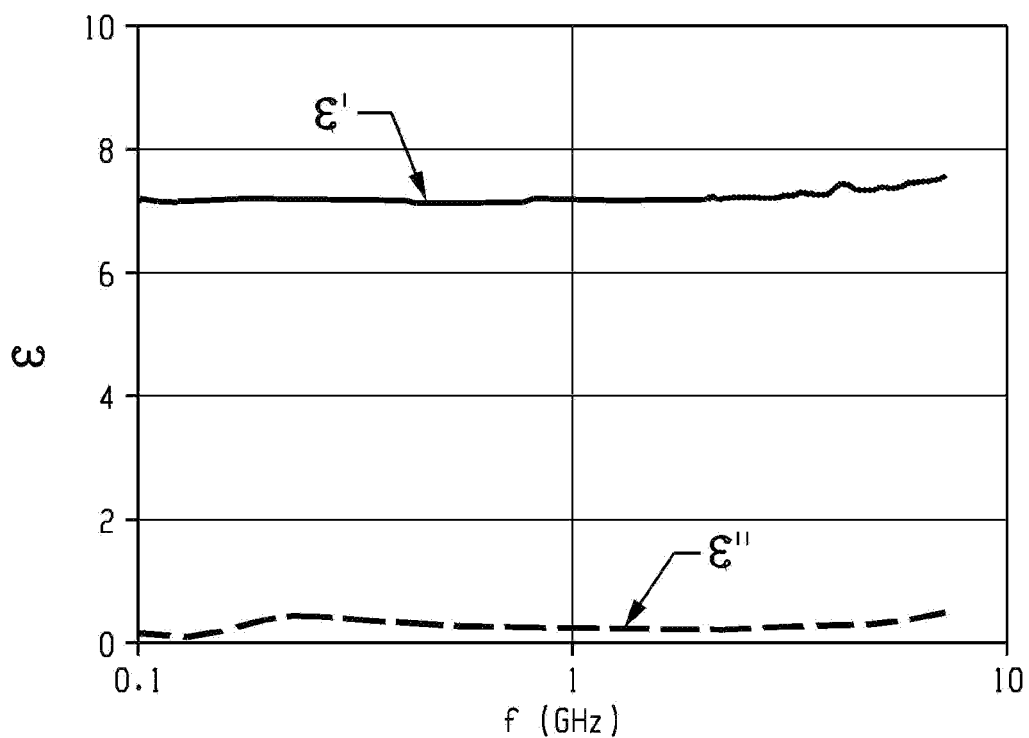
FIG. 8 shows the complex permittivity of the nanocrystalline $Ni_{0.5}Zn_{0.3}Co_{0.2}Fe_2O_4$ particle-paraffin wax composite produced in Example 3.

Example 3: Preparation of $Ni_{0.5}Zn_{0.3}Co_{0.2}Fe_2O_4$; Heat Treatment in Air $Ni_{0.5}Zn_{0.3}Co_{0.2}Fe_2O_4$ was prepared from a stoichiometric mixture of 30 g $\alpha$-$Fe_2O_3$, NiO, ZnO, and $Co_3O_4$ powders which were loaded into a planetary ball mill. Hardened chrome steel vials (500 mL in volume) and 10 mm hardened chrome steel balls were used in the milling process. The ball to powder mass ratio was 30:1. Milling was performed in air at 500 rpm for 30 hours. The synthesized cobalt-doped nickel zinc ferrite power was heat treated in air at 600° C. for 2 hours to control the nanocrystalline structure, ferrite phase, and $Fe^{2+}$. Then, the heat treated particles were blended with paraffin wax and tested using an NRW method as described above. FIG. 7 shows the complex permeability of the nanocrystalline $Ni_{0.5}Zn_{0.3}Co_{0.2}Fe_2O_4$ particle-paraffin wax composite. FIG. 8 shows the complex permittivity of the nanocrystalline $Ni_{0.5}Zn_{0.3}Co_{0.2}Fe_2O_4$ particle-paraffin wax composite. Table 3 provides a summary of the electromagnetic properties of the nanocrystalline $Ni_{0.5}Zn_{0.3}Co_{0.2}Fe_2O_4$.

TABLE 3

Summary of electromagnetic properties for the nanocrystalline
$Ni_{0.5}Zn_{0.3}Co_{0.2}Fe_2O_4$ particle-paraffin wax composite.

| f (GHz) | 0.5 | 1 | 1.6 | 2 | 3 |
|---|---|---|---|---|---|
| $\mu'$ | 1.75 | 1.75 | 1.79 | 1.84 | 1.97 |
| $Tan\delta_\mu$ | 0.041 | 0.022 | 0.018 | 0.029 | 0.141 |
| $\epsilon'$ | 7.13 | 7.14 | 7.15 | 7.16 | 7.17 |
| $Tan\delta_\epsilon$ | 0.036 | 0.025 | 0.024 | 0.025 | 0.028 |

Figure 9:
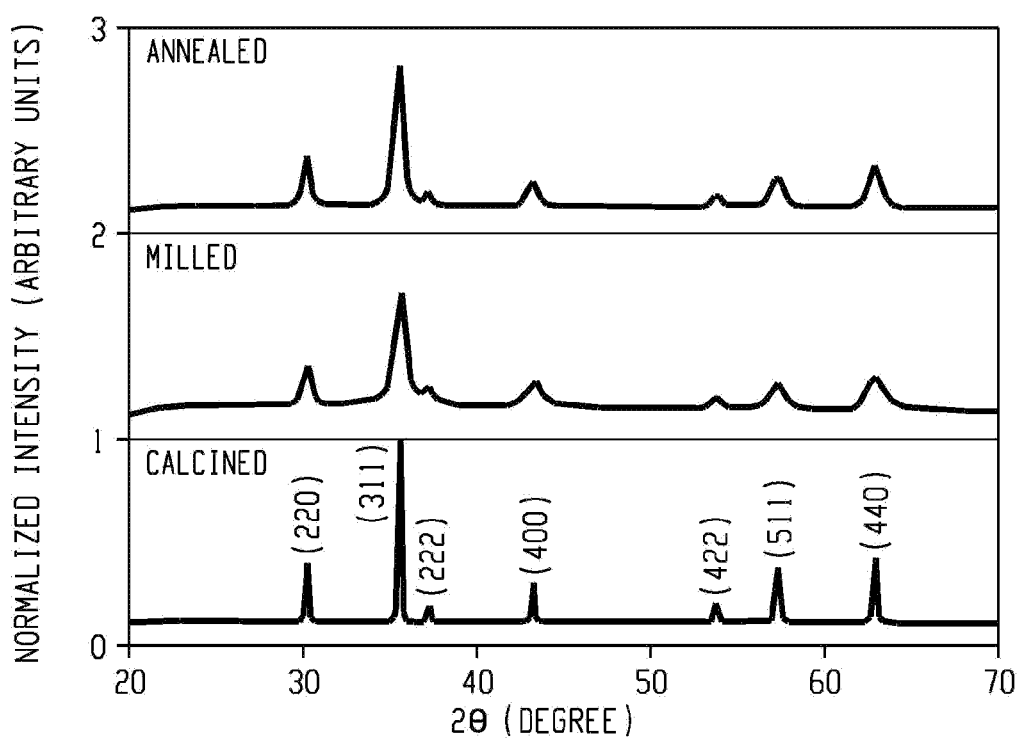
FIG. 9 shows the XRD pattern of the nanocrystalline $Ni_{0.5}Zn_{0.3}Co_{0.2}Fe_{1.95}O_4$ particles (spherical) produced in Example 4.
Figure 10:
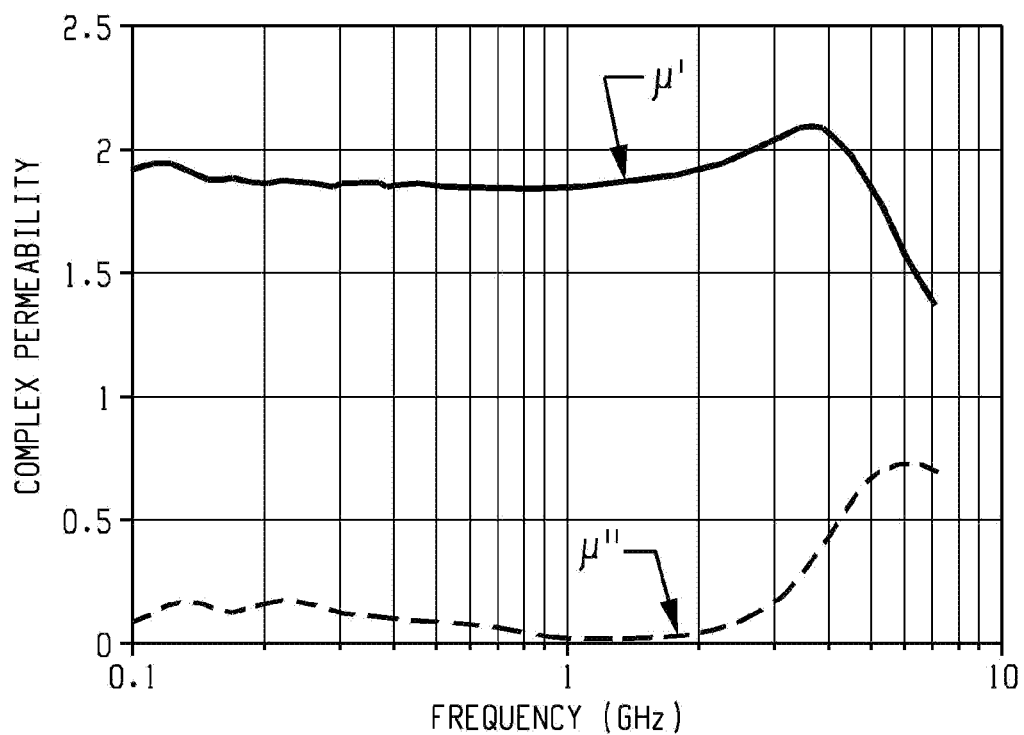
FIG. 10 shows the complex permeability of the nanocrystalline $Ni_{0.5}Zn_{0.3}Co_{0.2}Fe_{1.95}O_4$ particles produced in Example 4.
Figure 11:
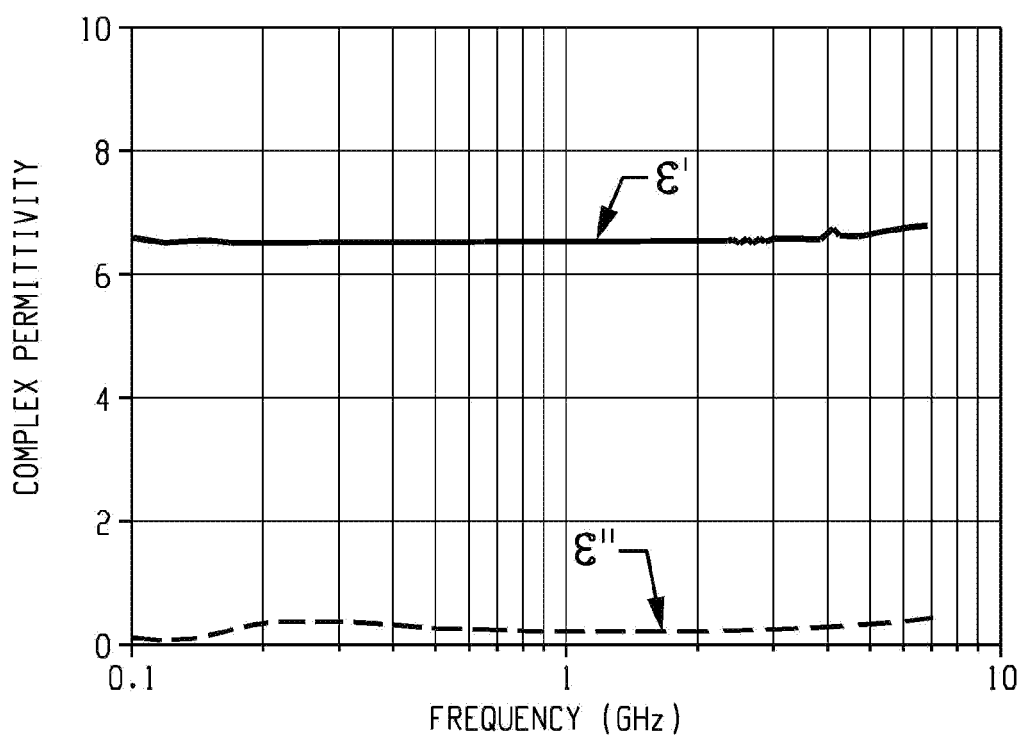
FIG. 11 shows the complex permittivity of the nanocrystalline $Ni_{0.5}Zn_{0.3}Co_{0.2}Fe_{1.95}O_4$ particles produced in Example 4.

Example 4: Preparation of $Ni_{0.5}Zn_{0.3}Co_{0.2}Fe_{1.95}O_4$ $\alpha$-$Fe_2O_3$, NiO, ZnO, and $Co_3O_4$ powders were blended and then calcined at 1,150° C. for 2 hours to synthesize ferrite with composition of $Ni_{0.5}Zn_{0.3}Co_{0.2}Fe_{1.95}O_4$. The calcined ferrite powder was loaded into a planetary ball mill for high energy ball milling. The ball to powder mass ratio was 30:1. The milling was performed in air at 500 rpm for 5 hours. The milled powder was then annealed in air at 580° C. for 2 hours to develop and control its nanocrystalline structure. Then, the annealed particles were blended with paraffin wax and tested using an NRW method as described above. FIG. 9 shows the XRD pattern of the nanocrystalline $Ni_{0.5}Zn_{0.3}Co_{0.2}Fe_{1.95}O_4$ particles (spherical) produced. FIG. 10 shows the complex permeability of the nanocrystalline $Ni_{0.5}Zn_{0.3}Co_{0.2}Fe_{1.95}O_4$ particle-paraffin wax composite. FIG. 11 shows the complex permittivity of the nanocrystalline $Ni_{0.5}Zn_{0.3}Co_{0.2}Fe_{1.95}O_4$ particle-paraffin wax composite. Table 4 provides a summary of the electromagnetic properties of the nanocrystalline $Ni_{0.5}Zn_{0.3}Co_{0.2}Fe_{1.95}O_4$.

TABLE 4

Summary of electromagnetic properties for the nanocrystalline
$Ni_{0.5}Zn_{0.3}Co_{0.2}Fe_{1.95}O_4$ particle-paraffin wax composite.

| f (GHz) | 0.5 | 1 | 1.6 | 2 | 3 |
|---|---|---|---|---|---|
| $\mu'$ | 1.85 | 1.85 | 1.90 | 1.92 | 2.05 |
| $Tan\delta_\mu$ | 0.046 | 0.010 | 0.010 | 0.019 | 0.081 |
| $\epsilon'$ | 6.50 | 6.49 | 6.50 | 6.51 | 6.52 |
| $Tan\delta_\epsilon$ | 0.035 | 0.031 | 0.026 | 0.026 | 0.029 |

Figure 12:
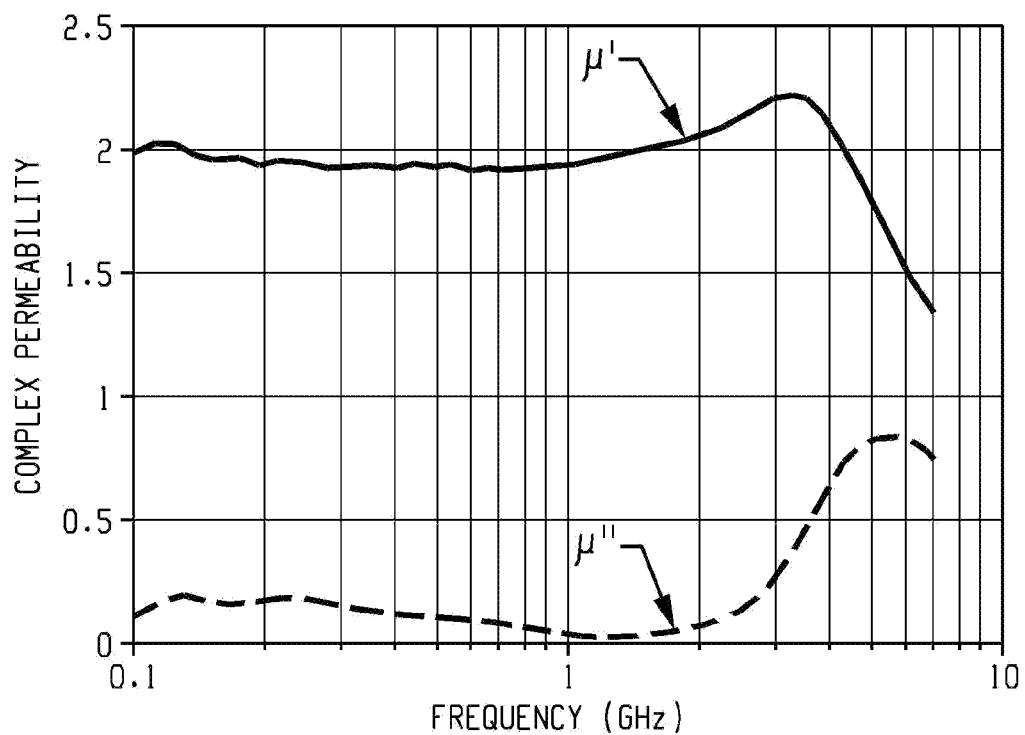
FIG. 12 shows the complex permeability of the nanocrystalline $Ni_{0.5}Zn_{0.3}Co_{0.2}Fe_{1.95}O_4$ particles produced in Example 5.
Figure 13:
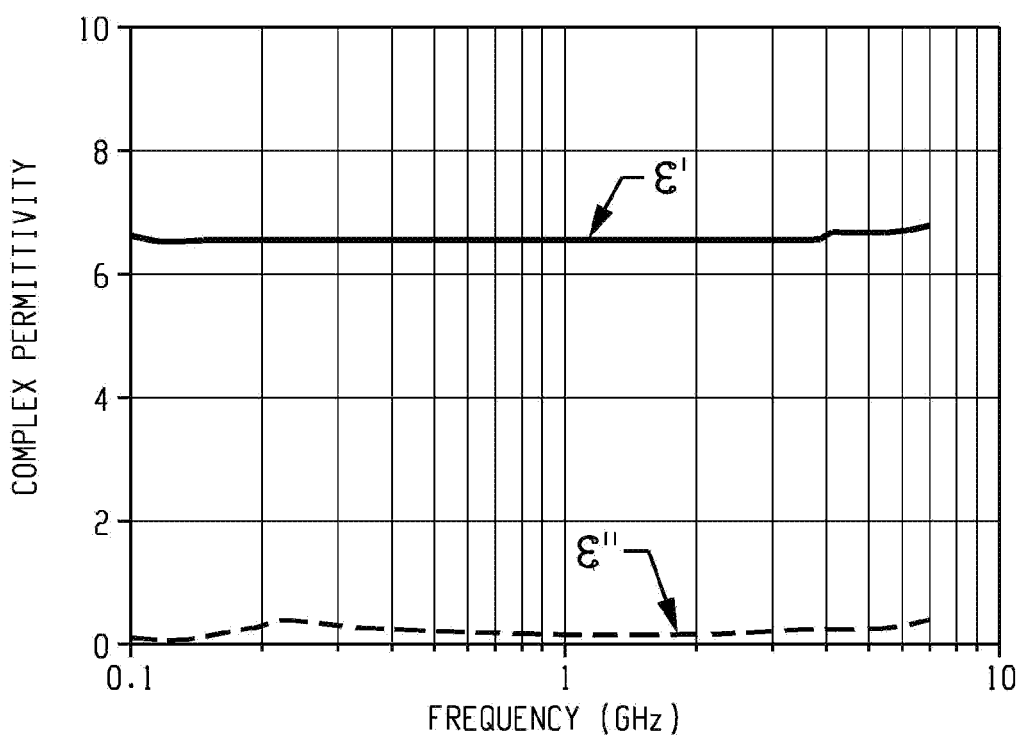
FIG. 13 shows the complex permittivity of the nanocrystalline $Ni_{0.5}Zn_{0.3}Co_{0.2}Fe_{1.95}O_4$ particles produced in Example 5.

Example 5: Preparation of $Ni_{0.5}Zn_{0.3}Co_{0.2}Fe_{1.95}O_4$ $\alpha$-$Fe_2O_3$, NiO, ZnO, and $Co_3O_4$ powders were blended and then calcined at 1,150° C. for 2 hours to synthesize ferrite with composition of $Ni_{0.5}Zn_{0.3}Co_{0.2}Fe_{1.95}O_4$. The calcined ferrite powder was loaded into a planetary ball mill for high energy ball milling. The ball to powder mass ratio was 30:1. The milling was performed in air at 500 rpm for 5 hours. The milled powder was then annealed in air at 600° C. for 2 hours to develop and control its nanocrystalline structure. Then, the annealed particles were blended with paraffin wax and tested using an NRW method as described above. FIG. 12 shows the complex permeability of the nanocrystalline $Ni_{0.5}Zn_{0.3}Co_{0.2}Fe_{1.95}O_4$ particle-paraffin wax composite. FIG. 13 shows the complex permittivity of the nanocrystalline $Ni_{0.5}Zn_{0.3}Co_{0.2}Fe_{1.95}O_4$ particle-paraffin wax composite. Table 5 provides a summary of the electromagnetic properties of the nanocrystalline $Ni_{0.5}Zn_{0.3}Co_{0.2}Fe_{1.95}O_4$.

TABLE 5

Summary of electromagnetic properties for the nanocrystalline
$Ni_{0.5}Zn_{0.3}Co_{0.2}Fe_{1.95}O_4$ particle-paraffin wax composite.

| f (GHz) | 0.5 | 1 | 1.6 | 2 | 3 |
|---|---|---|---|---|---|
| μ' | 1.93 | 1.94 | 2.01 | 2.05 | 2.20 |
| Tanδ$_μ$ | 0.052 | 0.014 | 0.016 | 0.029 | 0.115 |
| ε' | 6.53 | 6.51 | 6.51 | 6.52 | 6.54 |
| Tanδ$_ε$ | 0.034 | 0.029 | 0.024 | 0.025 | 0.030 |

Figure 14:
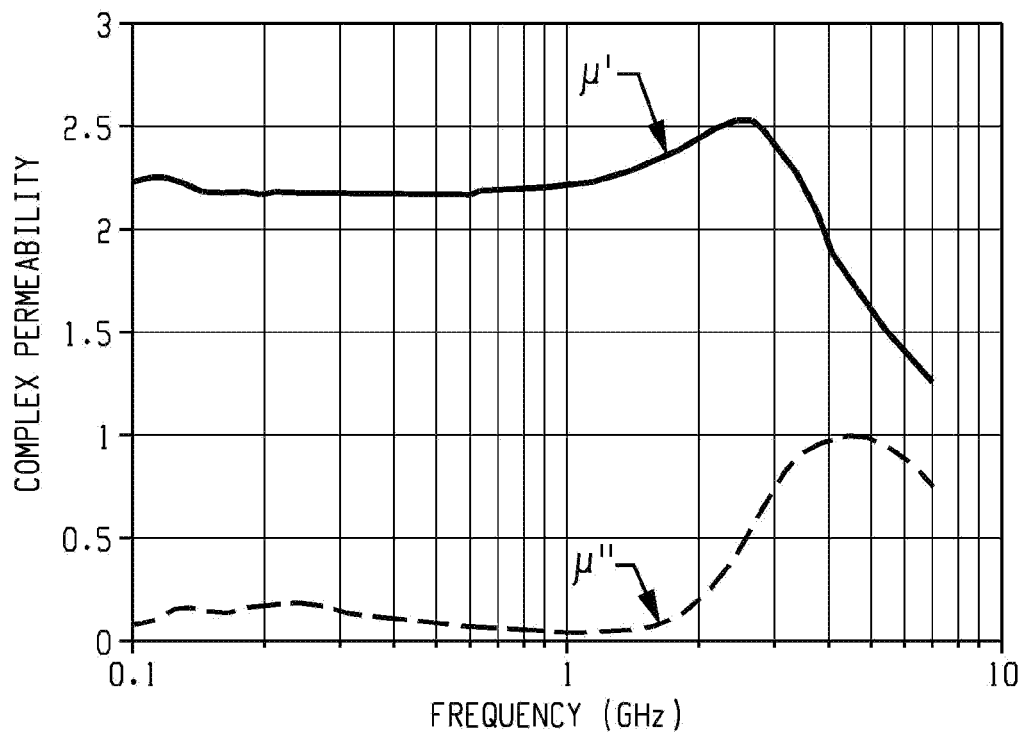
FIG. 14 shows the complex permeability of the nanocrystalline $Ni_{0.5}Zn_{0.3}Co_{0.2}Fe_{1.95}O_4$ particles produced in Example 6.
Figure 15:
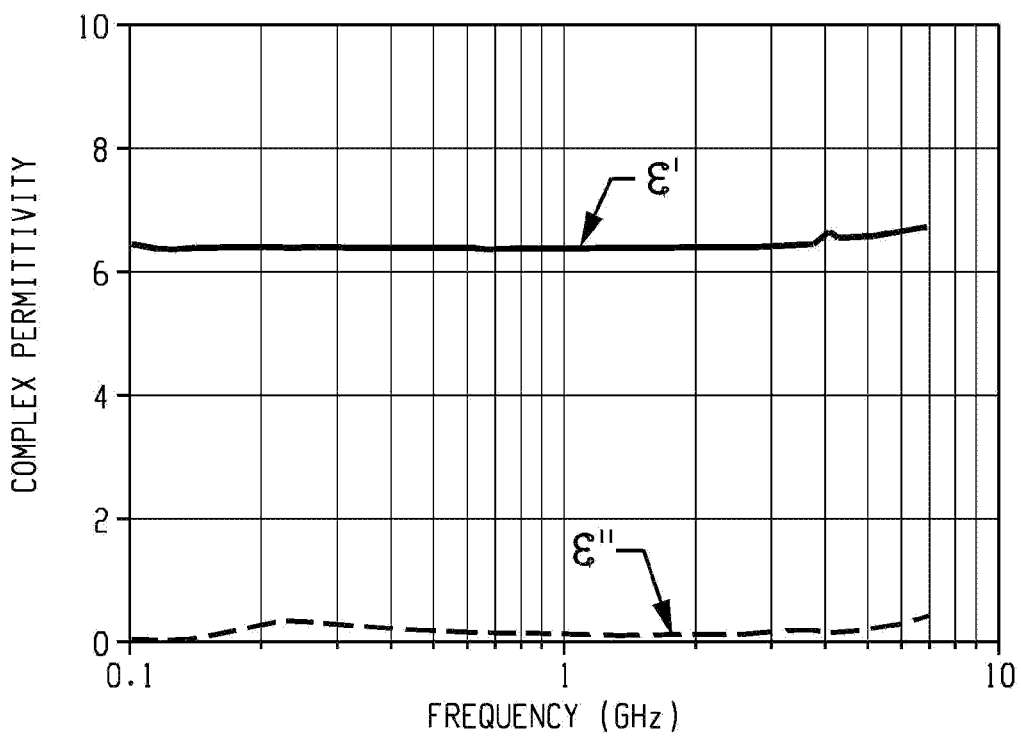
FIG. 15 shows the complex permittivity of the nanocrystalline $Ni_{0.5}Zn_{0.3}Co_{0.2}Fe_{1.95}O_4$ particles produced in Example 6.

Example 6: Preparation of $Ni_{0.5}Zn_{0.3}Co_{0.2}Fe_{1.95}O_4$

α-$Fe_2O_3$, NiO, ZnO, and $Co_3O_4$ powders were blended and then calcined at 1150° C. for 2 hours to synthesize ferrite with composition of $Ni_{0.5}Zn_{0.3}Co_{0.2}Fe_{1.95}O_4$. The calcined ferrite powder was loaded into a planetary ball mill for high energy ball milling. The ball to powder mass ratio was 30:1. The milling was performed in air at 500 rpm for 5 hours. Then, the milled powder was annealed in air at 700° C. for 5 minutes, following with a drawing at 550° C. for 3 hours to develop and control its nanocrystalline structure. Then, the heat treated particles were blended with paraffin wax and tested using an NRW method as described above. FIG. 14 shows the complex permeability of the nanocrystalline $Ni_{0.5}Zn_{0.3}Co_{0.2}Fe_{1.95}O_4$ particle-paraffin wax composite. FIG. 15 shows the complex permittivity of the nanocrystalline $Ni_{0.5}Zn_{0.3}Co_{0.2}Fe_{1.95}O_4$ particle-paraffin wax composite. Table 6 provides a summary of the electromagnetic properties of the nanocrystalline $Ni_{0.5}Zn_{0.3}Co_{0.2}Fe_{1.95}O_4$.

TABLE 6

Summary of electromagnetic properties for the nanocrystalline
$Ni_{0.5}Zn_{0.3}Co_{0.2}Fe_{1.95}O_4$ particle-paraffin wax composite.

| f (GHz) | 0.5 | 1 | 1.6 | 2 | 3 |
|---|---|---|---|---|---|
| μ' | 2.16 | 2.20 | 2.32 | 2.42 | 2.44 |
| Tanδ$_μ$ | 0.038 | 0.013 | 0.031 | 0.068 | 0.293 |
| ε' | 6.38 | 6.37 | 6.38 | 6.39 | 6.42 |
| Tanδ$_ε$ | 0.033 | 0.025 | 0.024 | 0.025 | 0.030 |

Set forth below are non-limiting aspects of the present disclosure.

Aspect 1: A nanocrystalline ferrite having the formula: $Ni_{1-x-y}M_yCo_xFe_{2+z}O_4$, wherein M is at least one of Zn, Mg, Cu, or Mn, x is 0.01 to 0.8, y is 0.01 to 0.8, and z is −0.5 to 0.5, and wherein the nanocrystalline ferrite has an average grain size of 5 to 100 nm, preferably 10 to 40 nm.

Aspect 2: The nanocrystalline ferrite of aspect 1, wherein the nanocrystalline ferrite has the formula $Ni_{1-x-y}Zn_yCo_xFe_{2+z}O_4$, wherein x is 0.1 to 0.3, y is 0.2 to 0.4, and z is −0.5 to 0.1.

Aspect 3: The nanocrystalline ferrite of any one of aspects 1 and 2, wherein the nanocrystalline ferrite is in the form of at least one of spherical particles with an average particle diameter of 0.2 to 100 micrometers, or platelet shaped particles with a longest dimension of 0.5 to 100 micrometers and a thickness of 0.05 to 1 micrometers, with the proviso that the longest dimension is greater than the platelet thickness.

Aspect 4: The nanocrystalline ferrite of any one of aspects 1 to 3, having at least one of a permeability of 1.5 to 5 at 0.1 to 6 gigahertz, or a permittivity of 3 to 8 at 0.1 to 6 gigahertz, wherein permeability and permittivity are determined as a paraffin wax composite with 60 volume percent nanocrystalline ferrite based on the total volume of the paraffin wax composite.

Aspect 5: A composite comprising: the nanocrystalline ferrite of any one of aspects 1 to 4 and a polymer.

Aspect 6: The composite of aspect 5, wherein the polymer comprises at least one of a fluoropolymer (for example, polyvinylidene fluoride (PVDF) or polytetrafluoroethylene (PTFE)), a polyolefin (for example, polyethylene (PE), high density polyethylene (HDPE), or low density polyethylene (LDPE)), a poly(arylene ether ketone) (for example, polyether ether ketone (PEEK)), a poly alkyl (meth)acrylate (for example, polymethylmethacrylate (PMMA)), or a poly (ether sulfone).

Aspect 7: The composite of any one of aspects 5 and 6, wherein the composite comprises 5 to 95 volume percent, or 30 to 70 volume percent of the nanocrystalline ferrite based on the total volume of the composite; and 5 to 95 volume percent, or 30 to 70 volume percent of the polymer based on the total volume of the composite.

Aspect 8: The composite of any one of aspects 5 to 7, wherein the composite has at least one of a permeability at 1 to 3 gigahertz of greater than or equal to 2, or greater than or equal to 3, or greater than or equal to 5, or 2 to 10; a magnetic loss tangent at 1 to 3 gigahertz of less than or equal to 0.05, or less than or equal to 0.02, or greater than 0 to 0.05; a permittivity at 0.1 to 6 gigahertz of less than or equal to 3, 4, 5, 6, 7, or 8, or 1 to 8; a dielectric loss tangent at 0.1 to 6 gigahertz of less than or equal to 0.02, or greater than 0 to 0.02; or a resonance frequency of 1 to 6 gigahertz; wherein the respective properties are determined using a Vector Network Analyzer (VNA) with a coaxial line in a Nicholson-Ross-Weir method, in a frequency range of 0.1 to 8.5 gigahertz.

Aspect 9: The composite of any one of aspects 5 to 8, wherein the composite has a magnetic loss tangent at 1 to 3 gigahertz of less than or equal to 0.05, or less than or equal to 0.02, or greater than 0 to 0.05, and a permeability at 1 to 3 gigahertz of greater than or equal to 3, or greater than or equal to 2, or 2 to 10.

Aspect 10: An article comprising the composite of any one of aspects 5 to 9.

Aspect 11: The article of aspect 10, wherein the article is an antenna, a transformer, an anti-electromagnetic interface material, or an inductor; and/or wherein the article is a microwave device.

Aspect 12: A method of forming the nanocrystalline ferrite, for example, of any one of aspects 1 to 4, comprising: high energy ball milling Ni, M, Co, and Fe precursor powders for a time (for example, 2 to 100 hours) and at a temperature sufficient (for example, 800 to 1200° C.) to provide an as-milled powder having a nickel ferrite phase, wherein the high energy ball milling optionally occurs at a vial rotation speed of 400 to 600 rpm, and heating the as-milled powder for a time (for example, 0.5 to 30 hours) and at a temperature (for example, 300 to 1,000° C.) sufficient to produce the nanocrystalline ferrite having a nanocrystalline structure with an average grain size of 5 to 100 nanometers.

Aspect 13: A method of forming the nanocrystalline ferrite, for example, of any one of aspects 1 to 4, comprising: mixing and heating of Ni, M, Co, and Fe precursor powders for a time (for example, 2 to 4 hours) and at a temperature (for example, 800 to 1200° C.) sufficient to provide a mixed powder having a nickel ferrite phase; high energy ball milling the mixed powder for a time (for example, 2 to 100 hours) to provide a milled powder having a disordered atomic-scale structure, wherein the high energy ball milling can optionally have a vial rotation speed of 400 to 600 rpm; and heating the milled powder for a time (for example, 0.5 to 30 hours) and at a temperature (for example, 300 to 1000° C.) sufficient to develop a nanocrystalline structure with an average grain size of 5 to 100 nm, preferably 10 to 40 nm.

Aspect 14: The method of aspect 12 or aspect 13, wherein the nanocrystalline ferrite has the formula $Ni_{1-x-y}Zn_y Co_xFe_{2+z}O_4$, wherein x is 0.1 to 0.3, y is 0.2 to 0.4, and z is −0.5 to 0.1.

Aspect 15: The method of any one of aspects 12 to 14, wherein the precursor powders comprise $\alpha$-$Fe_2O_3$, NiO, $Co_3O_4$, and ZnO.

Aspect 16: The method of any one of aspects 12 to 15, wherein the ball to total powder mass ratio during the high energy ball milling is 20:1 to 40:1.

Aspect 17: The method of aspect 16, wherein the balls have diameters of 3 mm to 20 mm.

Aspect 18: The method of any one of aspects 12 to 17, wherein the heating is done in at least one of air, argon, nitrogen, or oxygen.

Aspect 19: The method of any one of aspects 12 to 18, wherein the nanocrystalline ferrite is in the form of at least one of spherical with an average particle diameter of 0.2 to 100 micrometers, or platelet shaped particles with planar dimensions of 0.5 to 100 micrometers and a thickness of 0.05 to 1 micrometer.

Aspect 20: The method of any one of aspects 11 to 19, wherein the nanocrystalline ferrite has a permeability of 1.5 to 5 at 0.1 to 6 GHz, and/or a permittivity of 3 to 8 at 0.1 to 6 GHz, wherein permeability and permittivity are determined as a paraffin wax composite with 60 volume percent nanocrystalline ferrite based on the total volume of the paraffin wax composite.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

The terms "a" and "an" do not denote a limitation of quantity, but rather denote the presence of at least one of the referenced items. The term "or" means "and/or" unless clearly indicated otherwise by context. Reference throughout the specification to "an aspect", "an embodiment", "another embodiment", "some embodiments", and so forth, means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects. The terms "first," "second," and the like as used herein do not denote any order, quantity, or importance, but rather are used to distinguish one element from another. The term "combination" is inclusive of blends, mixtures, alloys, reaction products, and the like. Also, "at least one of" means that the list is inclusive of each element individually, as well as combinations of two or more elements of the list, and combinations of at least one element of the list with like elements not named. Unless defined otherwise, technical and scientific terms used herein have the same meaning as is commonly understood by one of skill in the art to which this disclosure belongs.

Unless specified to the contrary herein, all test standards are the most recent standard in effect as of the filing date of this application, or, if priority is claimed, the filing date of the earliest priority application in which the test standard appears. The endpoints of all ranges directed to the same component or property are inclusive of the endpoints, are independently combinable, and include all intermediate points and ranges. For example, ranges of "up to 25 vol. %, or 5 to 20 vol. %" is inclusive of the endpoints and all intermediate values of the ranges of "5 to 25 vol. %," such as 10 to 23 vol. %, etc.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. As used herein, the term "(meth)acryl" encompasses both acryl and methacryl groups. As used herein, the term "(iso)cyanurate" encompasses both cyanurate and isocyanurate groups.

All cited patents, patent applications, and other references are incorporated herein by reference in their entirety. However, if a term in the present application contradicts or conflicts with a term in the incorporated reference, the term from the present application takes precedence over the conflicting term from the incorporated reference. While particular aspects have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A nanocrystalline ferrite having the formula $$Ni_{1-x-y}M_yCo_xFe_{2+z}O_4$$

wherein M is at least one of Zn, Mg, Cu, or Mn, x is 0.01 to 0.8, y is 0.01 to 0.8, and z is −0.5 to 0.5, and wherein the nanocrystalline ferrite has an average grain size of 5 to 100 nm and the nanocrystalline ferrite is in the form of spherical particles with an average particle diameter of 0.2 to 100 micrometers.

2. The nanocrystalline ferrite of claim 1, wherein the nanocrystalline ferrite has the formula $Ni_{1-x-y}Zn_yCo_xFe_{2+z}O_4$, wherein x is 0.1 to 0.3, y is 0.2 to 0.4, and z is −0.5 to 0.1.

3. The nanocrystalline ferrite of claim 1, having at least one of a permeability of 1.5 to 5 at 0.1 to 6 gigahertz, or a permittivity of 3 to 8 at 0.1 to 6 gigahertz, wherein the permeability and permittivity are determined as a paraffin wax composite with 60 volume percent nanocrystalline ferrite based on the total volume of the paraffin wax composite.

4. A composite comprising:
the nanocrystalline ferrite of claim 1 and a polymer.

5. The composite of claim 4, wherein the polymer comprises at least one of a fluoropolymer, a polyolefin, a poly(arylene ether ketone), a poly alkyl (meth)acrylate, or a poly(ether sulfone).

6. The composite of claim 4, wherein the composite comprises 5 to 95 volume percent of the nanocrystalline ferrite based on the total volume of the composite; and 5 to volume percent of the polymer based on the total volume of the composite.

7. The composite of claim 4, wherein the composite has at least one of
a permeability at 1 to 3 gigahertz of greater than or equal to 2;

a magnetic loss tangent at 1 to 3 gigahertz of less than or equal to 0.05;
a permittivity at 0.1 to 6 gigahertz of less than or equal to 3;
a dielectric loss tangent at 0.1 to 6 gigahertz of less than or equal to 0.02; or
a resonance frequency of 1 to 6 gigahertz;
wherein the respective properties are determined using a Vector Network Analyzer (VNA) with a coaxial line in a Nicholson-Ross-Weir method, in a frequency range of 0.1 to 8.5 gigahertz.

8. The composite of claim 4, wherein the composite has
a magnetic loss tangent at 1 to 3 gigahertz of less than or equal to 0.05, and
a permeability at 1 to 3 gigahertz of greater than or equal to 3.

9. An article comprising the composite of claim 4.

10. The article of claim 9, wherein the article is an antenna, a transformer, an anti-electromagnetic interface material, or an inductor.

11. The nanocrystalline ferrite of claim 1, wherein the nanocrystalline ferrite is in the form of
platelet shaped particles with planar dimensions of 0.5 to 100 micrometers and a thickness of 0.05 to 1 micrometer.

12. The article of claim 9, wherein the article is a microwave device.

13. A nanocrystalline ferrite having the formula

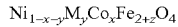

$Ni_{1-x-y}M_yCo_xFe_{2+z}O_4$ wherein M is at least one of Zn, Mg, Cu, or Mn, x is 0.01 to 0.8, y is 0.01 to 0.8, and z is −0.5 to 0.5, and
wherein the nanocrystalline ferrite has an average grain size of 5 to 100 nm and the nanocrystalline ferrite is in the form of spherical particles with an average particle diameter of 0.2 to 100 micrometers, and
wherein the nanocrystalline ferrite comprises a non-stoichiometric amount of Fe.

14. A method of forming the nanocrystalline ferrite of claim 1, comprising:
high energy ball milling at least one of Ni, M, Co, and Fe precursor powders or a mixed powder having a nickel ferrite phase for a time and at a temperature sufficient to provide an as-milled powder having a nickel ferrite phase, and
heating the as-milled powder for a time and at a temperature sufficient to produce the nanocrystalline ferrite having a nanocrystalline structure with an average grain size of 5 to 100 nanometers.

15. The method of claim 14, comprising:
prior to the high energy ball milling, mixing and heating of Ni, M, Co, and Fe precursor powders for a time and at a temperature sufficient to provide the mixed powder having a nickel ferrite phase.

16. The method of claim 14, wherein the nanocrystalline ferrite has the formula $Ni_{1-x-y}Zn_yCo_xFe_{2+z}O_4$, wherein x is 0.1 to 0.3, y is 0.2 to 0.4, and z is −0.5 to 0.1.

17. The method of claim 14, wherein the precursor powders comprise $\alpha$-$Fe_2O_3$, NiO, $Co_3O_4$, or ZnO.

18. The method of claim 14, wherein the ball to total powder mass ratio during the high energy ball milling is 20:1 to 40:1 and the ball has diameter of 3 mm to 20 mm.

19. The method of claim 14, wherein the heating is done in at least one of air, argon, nitrogen, or oxygen.

20. The method of claim 14, wherein the nanocrystalline ferrite has a permeability of 1.5 to 5 at 0.1 to 6 GHz, and/or a permittivity of 3 to 8 at 0.1 to 6 GHz, wherein the permeability and permittivity are determined as a paraffin wax composite with 60 volume percent nanocrystalline ferrite based on the total volume of the paraffin wax composite.

* * * * *